United States Patent
Black et al.

(10) Patent No.: US 8,737,911 B2
(45) Date of Patent: May 27, 2014

(54) DUAL-STAGE ECHO CANCELLATION IN A WIRELESS REPEATER USING AN INSERTED PILOT

(75) Inventors: Peter John Black, San Diego, CA (US); Dhananjay Ashok Gore, San Diego, CA (US); Gwendolyn Denise Barriac, Encinitas, CA (US)

(73) Assignee: QUALCOMM Incorporated, San Diego, CA (US)

( * ) Notice: Subject to any disclaimer, the term of this patent is extended or adjusted under 35 U.S.C. 154(b) by 230 days.

(21) Appl. No.: 12/609,698

(22) Filed: Oct. 30, 2009

(65) Prior Publication Data

US 2010/0285734 A1     Nov. 11, 2010

Related U.S. Application Data

(60) Provisional application No. 61/177,196, filed on May 11, 2009.

(51) Int. Cl.
*H04B 3/36*     (2006.01)

(52) U.S. Cl.
USPC ............. 455/7; 455/24; 455/13.3; 455/67.11; 455/18; 370/310; 370/315; 370/316; 370/317; 370/318; 375/211; 375/213

(58) Field of Classification Search
USPC ......... 455/11.1, 7, 24, 13.3, 15, 17, 1, 20, 22, 455/23, 422.1, 403, 500, 67.11, 423–425, 455/509, 515, 550.18; 370/310, 315, 316, 370/317, 318; 375/211, 213
See application file for complete search history.

(56) References Cited

U.S. PATENT DOCUMENTS

| | | | |
|---|---|---|---|
| 4,675,880 A | 6/1987 | Davarian | |
| 5,930,293 A | 7/1999 | Light et al. | |

(Continued)

FOREIGN PATENT DOCUMENTS

| | | | |
|---|---|---|---|
| CN | 1658532 A | 8/2005 | |
| CN | 1671161 A | 9/2005 | |

(Continued)

OTHER PUBLICATIONS

International Search Report and Written Opinion—PCT/US2010/034394—International Search Authority, European Patent Office, Jan. 28, 2011.

(Continued)

*Primary Examiner* — Keith Ferguson
(74) *Attorney, Agent, or Firm* — Thien T. Nguyen

(57) ABSTRACT

In one embodiment, a method for providing echo cancellation in a wireless repeater includes: adding the pilot signal to a transmit signal; receiving a receive signal being the sum of a remote signal, a feedback pilot signal and a feedback transmit signal; cancelling the feedback transmit signal from the receive signal using a currently available feedback channel estimate and generating a first echo cancelled signal; generating an updated feedback channel estimate using the first echo cancelled signal and the pilot signal as a reference signal; cancelling the feedback transmit signal and the feedback pilot signal from the receive signal using the updated feedback channel estimate and generating a second echo cancelled signal; and amplifying the second echo cancelled signal as the transmit signal. In another embodiment, the feedback pilot signal is cancelled from the first echo cancelled signal using the updated feedback channel estimate to generate the second echo cancelled signal.

32 Claims, 7 Drawing Sheets

(56) References Cited

U.S. PATENT DOCUMENTS

| | | |
|---|---|---|
| 6,061,548 A | 5/2000 | Reudink |
| 6,385,435 B1 | 5/2002 | Lee |
| 7,406,295 B1 | 7/2008 | Yarkosky |
| 7,480,486 B1 | 1/2009 | Oh et al. |
| 8,484,272 B2 | 7/2013 | Gore et al. |
| 2002/0039383 A1 | 4/2002 | Zhu et al. |
| 2002/0172184 A1 | 11/2002 | Kim et al. |
| 2003/0206579 A1 | 11/2003 | Bryant |
| 2004/0203911 A1 | 10/2004 | Masuda et al. |
| 2005/0227619 A1 | 10/2005 | Lee et al. |
| 2006/0014491 A1 | 1/2006 | Cleveland |
| 2006/0019603 A1 | 1/2006 | Pergal |
| 2006/0040611 A1 | 2/2006 | Ding et al. |
| 2006/0205343 A1* | 9/2006 | Runyon et al. ............... 455/11.1 |
| 2007/0213014 A1 | 9/2007 | Meacham et al. |
| 2008/0019314 A1 | 1/2008 | Gorokhov et al. |
| 2008/0113617 A1 | 5/2008 | Braithwaite |
| 2008/0137788 A1 | 6/2008 | Bang et al. |
| 2008/0176513 A1* | 7/2008 | Braithwaite et al. ............ 455/24 |
| 2008/0205661 A1* | 8/2008 | Kim et al. ..................... 381/66 |
| 2008/0227386 A1 | 9/2008 | Dayal et al. |
| 2008/0261519 A1 | 10/2008 | DeMarco et al. |
| 2009/0061766 A1 | 3/2009 | Ding et al. |
| 2010/0118922 A1 | 5/2010 | Ahn |
| 2010/0284280 A1 | 11/2010 | Gore et al. |
| 2010/0284445 A1 | 11/2010 | Barriac et al. |
| 2010/0285733 A1 | 11/2010 | Gore et al. |
| 2010/0285735 A1 | 11/2010 | Gore et al. |
| 2010/0285736 A1 | 11/2010 | Gore et al. |
| 2010/0285738 A1 | 11/2010 | Howard et al. |
| 2011/0002367 A1 | 1/2011 | Kummetz |

FOREIGN PATENT DOCUMENTS

| | | |
|---|---|---|
| CN | 1695320 A | 11/2005 |
| CN | 101044734 | 9/2007 |
| CN | 101232481 A | 7/2008 |
| CN | 101268667 A | 9/2008 |
| CN | 101312372 A | 11/2008 |
| EP | 0772310 A2 | 5/1997 |
| EP | 0851606 A2 | 7/1998 |
| EP | 1566900 A2 | 8/2005 |
| EP | 2053812 A2 | 4/2009 |
| JP | 2001007750 | 1/2001 |
| JP | 2001285167 | 10/2001 |
| JP | 2002077096 A | 3/2002 |
| JP | 2003198442 A | 7/2003 |
| JP | 2003258696 A | 9/2003 |
| JP | 2003273830 A | 9/2003 |
| JP | 2004153799 A | 5/2004 |
| JP | 2004187135 A | 7/2004 |
| JP | 2004328286 A | 11/2004 |
| JP | 2005236626 | 9/2005 |
| JP | 2006505211 A | 2/2006 |
| JP | 2007104570 A | 4/2007 |
| JP | 2008017236 A | 1/2008 |
| JP | 2009100458 A | 5/2009 |
| JP | 2010135929 A | 6/2010 |
| JP | 2010534439 A | 11/2010 |
| KR | 1020080081785 A | 9/2008 |
| TW | 200703963 | 1/2007 |
| TW | 200908599 A | 2/2009 |
| WO | WO2007034449 A2 | 3/2007 |
| WO | 2008115827 A2 | 9/2008 |
| WO | WO2009014281 A1 | 1/2009 |

OTHER PUBLICATIONS

Lee, M., et al. "An Interference Cancellation Scheme for Mobile Communication Radio Repeaters", IEICE Transactions on Communications, Communications Society, Tokyo, JP, vol. E92-B, No. 5, 1 May 2009, pp. 1778-1785, XP001547676.

* cited by examiner

DUAL-STAGE ECHO CANCELLATION IN A WIRELESS REPEATER USING AN INSERTED PILOT

CROSS-REFERENCE TO RELATED APPLICATIONS

This application claims the benefit of U.S. Provisional Patent Application Ser. No. 61/177,196, filed on May 11, 2009, which application is incorporated herein by reference in its entirety.

This application is related to the following concurrently filed and commonly assigned U.S. patent applications: application Ser. No. 12/609,874, entitled "Feedback Delay Control In An Echo Cancellation Repeater"; application Ser. No. 12/609,796, entitled "Delay Control To Improve Frequency Domain Channel Estimation In An Echo Cancellation Repeater"; application Ser. No. 12/609,579, entitled "Inserted Pilot Construction For An Echo Cancellation Repeater"; and application Ser. No. 12/609,505, entitled "Wideband Echo Cancellation In a Repeater". The applications are incorporated herein by reference in their entireties.

BACKGROUND

1. Field

This disclosure generally relates to repeaters in wireless communication systems, and in particular, to a method and apparatus for dual-stage echo cancellation in a wireless repeater using an inserted pilot.

2. Background

Wireless communication systems and techniques have become an important part of the way we communicate. However, providing coverage can be a significant challenge to wireless service providers. One way to extend coverage is to deploy repeaters.

In general, a repeater is a device that receives a signal, amplifies the signal, and transmits the amplified signal. FIG. 1 shows a basic diagram of a repeater 110, in the context of a cellular telephone system. Repeater 110 includes a donor antenna 115 as an example network interface to network infrastructure such as a base station 125. Repeater 110 also includes a server antenna 120 (also referred to as a "coverage antenna") as a mobile interface to mobile device 130. In operation, donor antenna 115 is in communication with base station 125, while server antenna 120 is in communication with mobile devices 130.

In repeater 110, signals from base station 125 are amplified using forward link circuitry 135, while signals from mobile device 130 are amplified using reverse link circuitry 140. Many configurations may be used for forward link circuitry 135 and reverse link circuitry 140.

There are many types of repeaters. In some repeaters, both the network and mobile interfaces are wireless; while in others, a wired network interface is used. Some repeaters receive signals with a first carrier frequency and transmit amplified signals with a second different carrier frequency, while others receive and transmit signals using the same carrier frequency. For "same frequency" repeaters, one particular challenge is managing the feedback that occurs since some of the transmitted signal can leak back to the receive circuitry and be amplified and transmitted again.

Existing repeaters manage feedback using a number of techniques; for example, the repeater is configured to provide physical isolation between the two antennae, filters are used, or other techniques may be employed.

SUMMARY

Systems, apparatuses, and methods disclosed herein allow for enhanced repeater capability. According to one embodiment of the present invention, a wireless repeater has first and second antennas. For repeating a particular signal, one antenna is a receiving antenna and the other is a transmitting antenna. In some embodiments, the repeater includes a pilot insertion unit for generating a pilot signal where the pilot signal is added to a transmit signal for transmission on the transmitting antenna as a composite transmit signal. The wireless repeater further includes a first echo canceller receiving a receive signal and the transmit signal and generating a first echo cancelled signal using a currently available feedback channel estimate where the receive signal is the sum of a remote signal to be amplified, a feedback pilot signal and a feedback transmit signal and the feedback pilot signal, and the feedback transmit signal are feedback signals fed back to the receiving antenna on a feedback channel between the transmitting antenna and the receiving antenna. The first echo canceller uses the currently available feedback channel estimate to remove the feedback transmit signal from the receive signal. The wireless repeater further includes a channel estimation block receiving the first echo cancelled signal and also receiving the pilot signal as a reference signal. The channel estimation block generates an updated feedback channel estimate based on the first echo cancelled signal and the reference signal. The wireless repeater further includes a second echo canceller receiving the receive signal, the pilot signal and the transmit signal and generating a second echo cancelled signal using the updated feedback channel estimate. The second echo canceller uses the updated feedback channel estimate to remove the feedback transmit signal and the feedback pilot signal from the receive signal, thereby generating the second echo cancelled signal indicative of the remote signal. Finally, the wireless repeater further includes an amplifier for amplifying the second echo cancelled signal as the transmit signal. The pilot signal is added to the transmit signal to be transmitted on the transmit antenna as the composite transmit signal.

According to another aspect of the present invention, a method for providing echo cancellation in a wireless repeater in a wireless communication system includes: generating a pilot signal and adding the pilot signal to a transmit signal for transmission on a transmitting antenna as a composite transmit signal; receiving a receive signal at a receive antenna of the repeater where the receive signal is the sum of a remote signal to be amplified, a feedback pilot signal and a feedback transmit signal and the feedback pilot signal, and the feedback transmit signal are feedback signals fed back to the receiving antenna on a feedback channel between the transmitting antenna and the receiving antenna; cancelling the feedback transmit signal from the receive signal using a currently available feedback channel estimate and generating a first echo cancelled signal; generating an updated feedback channel estimate using the first echo cancelled signal and the pilot signal as a reference signal; cancelling the feedback transmit signal and the feedback pilot signal from the receive signal using the updated feedback channel estimate and generating a second echo cancelled signal; amplifying the second echo cancelled signal as the transmit signal; and transmitting the transmit signal and the pilot signal on the transmitting antenna as the composite transmit signal.

According to yet another aspect of the present invention, a wireless repeater having a receiving antenna and a transmitting antenna includes a pilot insertion unit for generating a pilot signal where the pilot signal is added to a transmit signal for transmission on the transmitting antenna as a composite transmit signal. The wireless repeater further includes a first echo canceller receiving a receive signal and the transmit signal and generating a first echo cancelled signal using a currently available feedback channel estimate. The receive signal is the sum of a remote signal to be amplified, a feedback pilot signal and a feedback transmit signal, and the feedback pilot signal and the feedback transmit signal are feedback signals fed back to the receiving antenna on a feedback channel between the transmitting antenna and the receiving antenna. The first echo canceller uses the currently available feedback channel estimate to remove the feedback transmit signal from the receive signal. The wireless repeater further includes a channel estimation block receiving the first echo cancelled signal and also receiving the pilot signal as a reference signal. The channel estimation block generates an updated feedback channel estimate based on the first echo cancelled signal and the reference signal. The wireless repeater further includes a second echo canceller receiving the first echo cancelled signal and the pilot signal and generating a second echo cancelled signal using the updated feedback channel estimate. The second echo canceller uses the updated feedback channel estimate to remove the feedback pilot signal from the first echo cancelled signal, thereby generating the second echo cancelled signal indicative of the remote signal. Finally, the wireless repeater includes an amplifier for amplifying the second echo cancelled signal as the transmit signal where the pilot signal is added to the transmit signal to be transmitted on the transmit antenna as the composite transmit signal.

According to yet another aspect of the present invention, a method for providing echo cancellation in a wireless repeater in a wireless communication system includes generating a pilot signal and adding the pilot signal to a transmit signal for transmission on a transmitting antenna as a composite transmit signal; receiving a receive signal at a receive antenna of the repeater where the receive signal is the sum of a remote signal to be amplified, a feedback pilot signal and a feedback transmit signal, and the feedback pilot signal and the feedback transmit signal are feedback signals fed back to the receiving antenna on a feedback channel between the transmitting antenna and the receiving antenna; cancelling the feedback transmit signal from the receive signal using a currently available feedback channel estimate and generating a first echo cancelled signal; generating an updated feedback channel estimate using the first echo cancelled signal and the pilot signal as a reference signal; cancelling the feedback pilot signal from the first echo cancelled signal using the updated feedback channel estimate and generating a second echo cancelled signal; amplifying the second echo cancelled signal as the transmit signal; and transmitting the transmit signal and the pilot signal on the transmitting antenna as the composite transmit signal.

DETAILED DESCRIPTION

Figure 1:
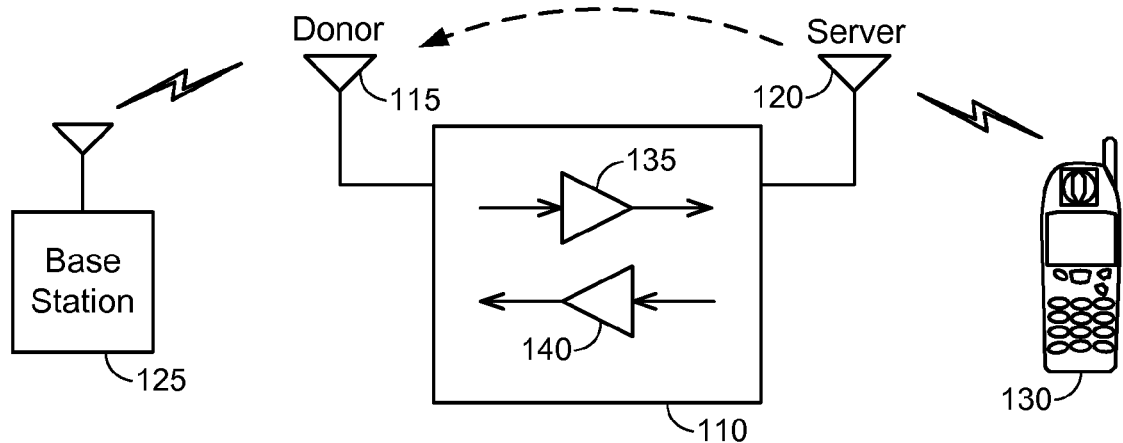
FIG. 1 is a simplified diagram of a repeater according to the prior art.

The nature, objectives, and advantages of the disclosed method and apparatus will become more apparent to those skilled in the art after considering the following detailed description in connection with the accompanying drawings.

Prior art repeaters such as those described above may provide significant advantages for cellular telephone or similar networks. However, existing repeater configurations may not be suitable for some applications. For example, existing repeater configurations may not be suitable for indoor coverage applications (e.g., repeating signals for a residence or business environment) which may require substantially more isolation between the repeater's antennas. Moreover, in some traditional repeater implementations, the target is to achieve as high a gain as reasonable while maintaining a stable feedback loop (loop gain less than unity). However, increasing the repeater gain renders isolation more difficult due to the increased signal leaking back into the donor antenna. In general, loop stability demands require that the signal leaking back into the donor antenna from the coverage antenna be much lower than the remote signal (the signal to be repeated). The maximum achievable signal to interference/noise ratio (SINR) at the output of the repeater is then the same as the SINR at the input to the repeater. High gain and improved isolation form two contradicting demands required for modern day repeaters, especially those for indoor applications.

Systems and techniques herein provide for wireless repeaters with improved isolation between the repeaters' donor antenna ("the receiving antenna" for the example of a forward link transmission) and the coverage antenna ("the transmitting antenna" for forward link transmissions). Furthermore, in some embodiments, systems and techniques herein provide for a unique repeater design employing interference cancellation or echo cancellation to significantly improve the isolation. In some embodiments, the interference cancellation and echo cancellation are realized using improved channel estimation techniques provided herein for accurate estimation of the channel. Effective echo cancellation requires very accurate channel estimation of the leakage channel. In general, the more accurate the channel estimate, the higher the cancellation and hence the higher the effective isolation. Herein, "interference cancellation" or "echo cancellation" refers to techniques that reduce or eliminate the amount of leakage signal between repeater antennas; that is, "interference cancellation" refers to cancellation of an estimated leakage signal, which provides for partial or complete cancellation of the actual leakage signal.

According to another aspect of the present invention, systems and techniques herein provide for a unique wireless repeater design employing gain control techniques for enhancing the stability of the repeater system. In some embodiments, a metric for measuring the stability of the repeater system is provided. The gain of the repeater is controlled based on the value of the metric as an indicator of stability. For example, in the event of large signal dynamics, a metric, such as the loop gain, becomes degraded and the gain will be reduced to keep the repeater system stable. The gain control methods and systems can be advantageously applied to repeaters employing interference cancellation or repeaters not employing interference cancellation.

Lastly, according to yet another aspect of the present invention, systems and techniques herein provide for improving wireless repeater performance in a multi-repeater environment. In some embodiments, systems and techniques that facilitate inter-repeater communication are provided. In other embodiments, systems and techniques for suppressing interference and reducing delay spread from neighboring repeaters are provided.

Figure 2:
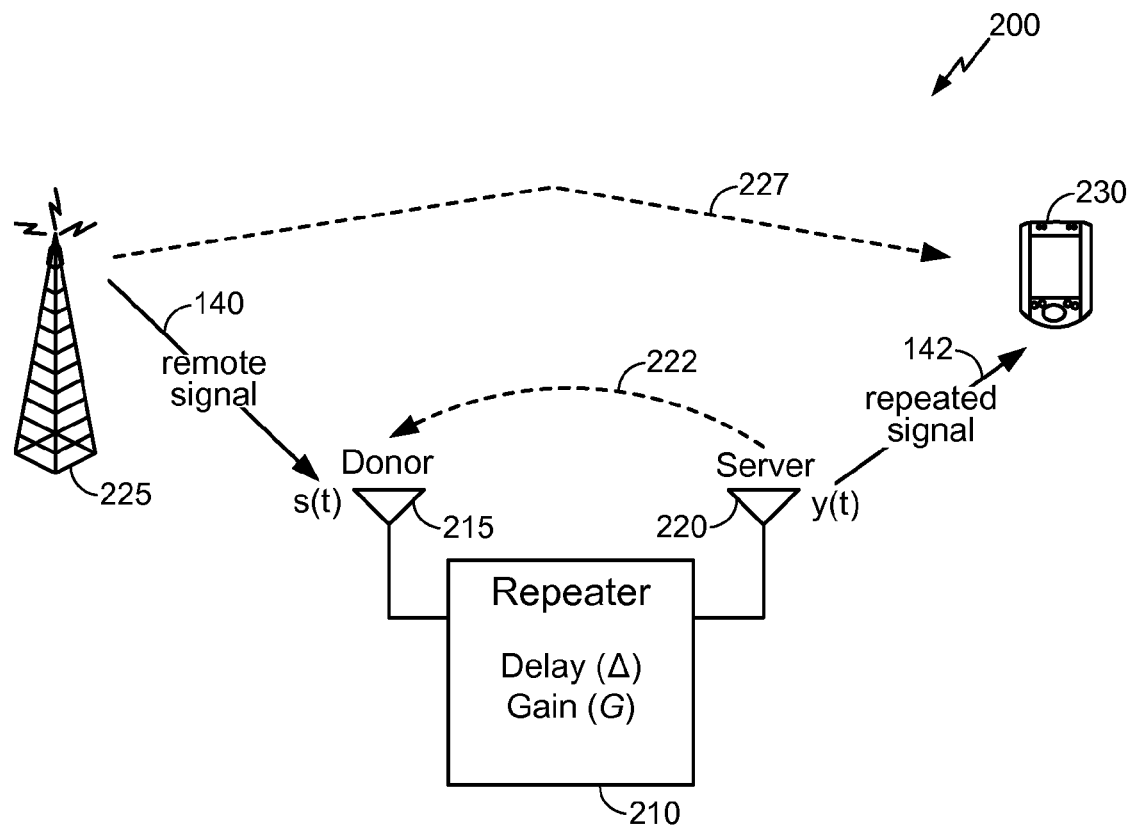
FIG. 2 shows a diagram of a repeater environment according to some embodiments of the current disclosure.

FIG. 2 shows a diagram of an operating environment 200 for a repeater 210 according to embodiments of the current disclosure. The example of FIG. 2, illustrates forward link transmissions; i.e., a remote signal 140 from a base station 225 is intended for a mobile device 230. A repeater, such as repeater 210, may be used in environment 200 if an un-repeated signal along the path 227 between base station 225 and mobile device 230 would not provide sufficient signal for effective voice and/or data communications received at mobile device 230. Repeater 210 with a gain G and a delay $\Delta$ is configured to repeat a signal received from base station 225 on a donor antenna 215 to mobile device 230 using a server antenna 220. Repeater 210 includes forward link circuitry for amplifying and transmitting signals received from the base station 225 to mobile device 230 through donor antenna 215 and server antenna 220. Repeater 210 may also include reverse link circuitry for amplifying and transmitting signals from mobile device 230 back to base station 225. At repeater 210, the remote signal s(t) is received as an input signal and the remote signal s(t) is repeated as a repeated or amplified signal y(t) where $y(t)=\sqrt{G}s(t-\Delta)$. Ideally, the gain G would be large, the inherent delay $\Delta$ of the repeater would be small, the input SINR would be maintained at the output of repeater 210 (this can be of particular importance for data traffic support), and only desired carriers would be amplified.

In practice, the gain of repeater 210 is limited by the isolation between donor antenna 215 and server antenna 220. If the gain is too large, the repeater can become unstable due to signal leakage. Signal leakage refers to the phenomenon where a portion of the signal that is transmitted from one antenna (in FIG. 2, server antenna 220) is received by the other antenna (in FIG. 2, donor antenna 215), as shown by the feedback path 222 in FIG. 2. Without interference cancellation or other techniques, the repeater would amplify this feedback signal, also referred to as the leakage signal, as part of its normal operation, and the amplified feedback signal would again be transmitted by server antenna 220. The repeated transmission of the amplified feedback signal due to signal leakage and high repeater gain can lead to repeater instability. Additionally, signal processing in repeater 210 has an inherent non-negligible delay A. The output SINR of the repeater is dependent on RF non-linearities and other signal processing. Thus, the aforementioned ideal repeater operational characteristics are often not attained. Finally, in practice, the desired carriers can vary depending on the operating environment or market in which the repeater is deployed. It is not always possible to provide a repeater that amplifies only the desired carriers.

In embodiments of the current disclosure, a repeater suitable for indoor coverage (e.g., business, residential, or similar use) is provided. The repeater has an active gain of about 70 dB or greater which is an example of a sufficient gain for coverage in a moderately sized residence. Furthermore, the repeater has a loop gain of less than one for stability (loop gain being referred to as the gain of the feedback loop between the transmitting antenna and the receiving antenna) and a sufficient amount of margin for stability and low output noise floor. In some embodiments, the repeater has a total isolation of greater than 80 dB. In some embodiments, the repeater employs interference/echo cancellation to achieve a high level of active isolation, which is significantly more challenging than the requirements of available repeaters.

Some techniques of the current disclosure utilize channel estimation to enable the required level of echo cancellation. By estimating the feedback channel (the channel between the antennas) to a sufficient degree of accuracy, the residual error, post echo cancellation, can be sufficiently below the remote signal to realize the desired loop gain margin for stability.

The communication system in which the repeater of the present invention can be deployed includes various wireless communication networks based on infrared, radio, and/or microwave technology. Such networks can include, for example, a wireless wide area network (WWAN), a wireless local area network (WLAN), a wireless personal area network (WPAN), and so on. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as CDMA2000, Wideband-CDMA (W-CDMA), and so on. CDMA2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). CDMA2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The systems and techniques described herein may also be used for any combination of WWAN, WLAN and/or WPAN.

Interference/Echo Cancelling Techniques

In some embodiments, a repeater employing echo cancellation uses the transmit signal as the pilot or reference signal for estimating the feedback channel (or "the leakage channel") and also for echo cancellation. For the purpose of estimating the feedback channel, the transmit signal is the pilot and the remote signal is treated as noise. The received signal of the repeater is the remote signal plus the feedback signal (or the leakage signal). The transmit signal is fed into the channel estimation algorithm and the resulting feedback channel estimate ($\hat{h}$) is used to generate a replica of the feedback signal—that is, the portion of the transmit signal that was echoed back to the donor antenna. The estimated feedback signal is then subtracted from the received signal to cancel out the undesired feedback signal at the input to the repeater. Echo cancellation is thus realized in the repeater.

In other embodiments, a repeater employing echo cancellation uses an inserted pilot as the reference signal for estimating the feedback channel and also for echo cancellation. In an amplify-and-forward repeater, the remote signal is unlikely to have a cyclic prefix. By inserting a known pilot in the RF signal, the issue associated with the lack of a cyclic prefix is obviated.

1. Feedback Delay Control Method

In one embodiment, a feedback delay control method is implemented in an echo cancellation repeater to improve the channel estimation and echo cancellation performance. In the feedback delay control method, a variable delay (D1) is introduced in the repeater to decrease the correlation between the pilot and the remote signal. Correlation between the pilot, which is the transmit signal, and the remote signal can degrade the channel estimation. The values of variable delay D1 is selected to introduce enough delay to reduce the correlation without degrading the performance of the repeater. Details of the feedback delay control method in an echo cancellation repeater will be described in more detail below with reference to FIG. 3A.

Figure 3A:
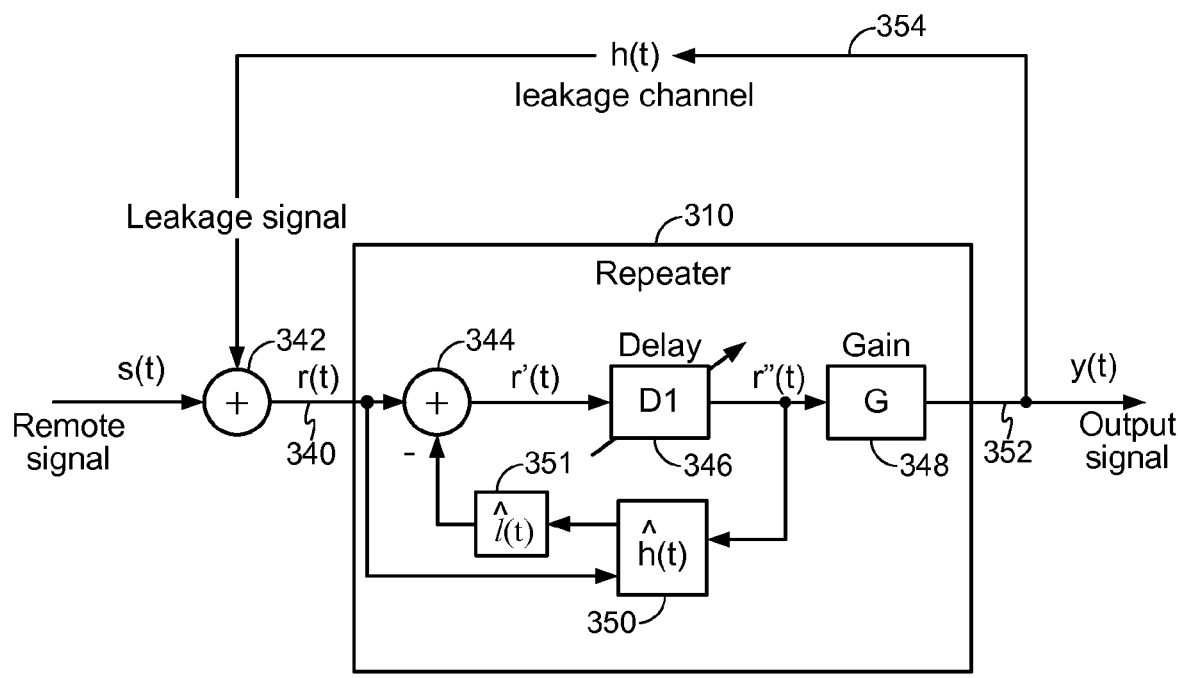
FIG. 3A is a block diagram of an echo cancellation repeater implementing feedback delay control according to one embodiment of the present invention.

FIG. 3A is a block diagram of an echo cancellation repeater implementing feedback delay control according to one embodiment of the present invention. Referring to FIG. 3A, the 'remote signal' s(t) is the signal to be amplified, the 'output signal' y(t) is the amplified signal and the 'leakage signal' or 'feedback signal' is an attenuated version of the output signal that leaks back into the receive (or donor) antenna from the transmit (or coverage) antenna. The feedback channel, also referred to as the leakage channel, is depicted as 'h(t)'.

For typical repeater operation, the total loop gain has to be less than 1 for stability. This usually implies that in typical repeaters, the amplifier gain 'G' is limited by the antenna isolation (from transmit to receive). According to one aspect of the present invention, the effective isolation is increased through baseband interference cancellation where the feedback signal is estimated and cancelled at baseband in the repeater device. This allows the repeater gain 'G' to be increased. A very accurate feedback channel estimate is required for effective cancellation. In fact, in general, the more accurate the channel estimate, the higher the cancellation and hence the higher the effective isolation.

According to one embodiment of the present invention, for the purpose of channel estimation, the output signal y(t), or a signal indicative of the output signal y(t) is used as the pilot signal and the remote signal s(t) is treated as noise. The remote signal s(t) (and hence also the feedback signal) are cellular signals and thus may be treated like band limited random processes. Given that s(t) is a band limited signal, samples that are close to each other can be correlated. Correlation can also be due to delay spread between the base station and the repeater. Typically, pilot and noise correlation can cause a bias in the feedback channel estimate leading to inaccuracies in the channel estimate and degraded repeater performance. The smaller the band, the larger the correlation and the more severe the degradation. When the feedback signal y(t) is used as the pilot signal and the remote signal is treated as noise, there can be a strong correlation between the pilot signal and the noise because the remote signal s(t) and the output signal y(t), being the repeated remote signal, are essentially the same signal.

Typically, for a band limited process or in presence of delay spread in the channel between the base station and the repeater, the correlation reduces as a function of delay between samples, i.e., pieces of signal with larger delay between them are less correlated than pieces of signal with smaller delay between them. Thus the correlation can be reduced and channel estimation/interference cancellation performance improved by increasing the delay between the samples. However, there is a competing requirement on the delay. For multiple reasons (demodulation, position location) the delay introduced in the signal by the repeater should be small as possible, except for a minimum delay that is required from baseband processing.

With reference to FIG. 3A, an echo cancellation repeater 310 receives a remote signal s(t) on a donor antenna (denoted as input node 340) and generates an output signal y(t) to be transmitted on a server antenna (denoted as output node 352). Signal leakage from the server antenna back to the donor antenna causes part of the output signal y(t) to be leaked back and added to the remote signal before being received by the repeater. The signal leakage is represented as a feedback channel h(t), denoted as a signal path 354 between output node 352 and the input node 340. Thus, repeater 310 actually receives as the input signal a receive signal r(t) being the sum of the remote signal s(t) and the feedback signal. Summer 342 in FIG. 3A is symbolic only to illustrate the signal components of receive signals r(t) and does not represent an actual signal summer in the operating environment of repeater 310.

Repeater 310, being an echo cancellation repeater, operates to estimate the feedback signal in order to cancel out the undesired feedback signal component in the receive signal ("the input signal"). To that end, receive circuitry of repeater 310 includes an echo canceller formed by a summer 344 and a feedback signal estimation block 351 working in conjunction with a channel estimation block 350. The received signal r(t) is coupled to summer 344 which operates to subtract a feedback signal estimate $\hat{l}(t)$ from the receive signal r(t). As long as the feedback signal estimate $\hat{l}(t)$ is accurate, the undesired feedback signal is removed from the receive signal and echo cancellation is realized. In the present embodiment, the post cancellation signal r'(t) is coupled through a delay element 346 having a variable delay D1 (to be discussed below) and then coupled to a gain stage 348 providing a gain of G to the post cancellation signal. Gain stage 348 generates the output signal y(t) on the output node 352 for transmission on the server antenna. FIG. 3A illustrates only elements that are relevant to operation of the feedback delay control method in an echo cancellation repeater. Repeater 310 may include other elements not shown in FIG. 3A but known in the art to realize the complete repeater operation.

Channel estimation block 350 operates to estimate the feedback channel h(t) and computes an estimate of the feedback channel $\hat{h}(t)$. Feedback signal estimation block 351 takes the feedback channel estimate $\hat{h}(t)$ and computes an estimate of the feedback signal for the purpose of echo cancellation. In the present embodiment, the channel estimation block 350 uses the receive signal r(t) and also uses the echo cancelled signal as the pilot signal or the reference signal for channel estimation. The feedback signal estimation block 351 computes the feedback signal estimate $\hat{l}(t)$ based on the feedback channel estimate $\hat{h}(t)$ where the feedback signal estimate is used for echo cancellation at summer 344. More specifically, the feedback signal estimate $\hat{l}(t)$ is a convolution of the feedback channel estimate $\hat{h}(t)$ and the reference signal which is indicative of the transmit signal.

According to the feedback delay control method of the present invention, a variable delay D1 is provided in the receive circuitry of echo cancellation repeater 310 to introduce a delay in the post cancellation signal of the echo cancellation repeater. The delay D1 is just large enough for the output signal y(t) and the remote signal s(t) to be decorrelated but small enough to meet repeater performance requirement. For example, the delay may be selected to provide decorrelation between the output signal y(t) and the remote signal s(t), but less than a maximum desired decorrelation delay amount. The variable delay D1 is tunable and can be adjusted when the repeater is started up and can be tuned periodically when the repeater is in operation to account for changes in the correlation structure of the remote signal.

In the present embodiment, repeater 310 includes a delay element 346 in the signal path of the post cancellation signal to introduce a delay D1 to the post cancellation signal r'(t). The delayed echo cancelled signal r"(t) is coupled to gain stage 348 to generate the output signal y(t). The delayed echo cancelled signal r"(t) is also coupled to the channel estimation block 350 for use in channel estimation and is further coupled to the feedback signal estimation block 351 for estimating the feedback signal (not shown). In this manner, a certain amount of delay D1 is introduced between the output signal y(t), which is being fed back through the feedback channel h(t) as the feedback signal, and the remote signal s(t).

In operation, a sufficiently large delay between echo cancelled output signal y(t) and the remote signal s(t) improves channel estimation and thereby improves repeater performance. In one embodiment, the desired amount of delay is a function of the number of carriers contained within the signal s(t). In another embodiment, the desired amount of delay is a function of the bandwidth of the carriers contained within the signal s(t). For example, 3 DO carriers within 5 MHz would require more delay than 4 WCDMA carriers over 20 MHz. Thus, delay D1 is a variable delay or tunable delay to allow the amount of delay to be modified depending on the signal that is to be repeated.

In one embodiment, the amount of delay D1 is tuned or adjusted by searching. That is, the delay D1 is adjusted until either the maximum allowable delay is reached or until the echo cancelled output signals y(t) are sufficiently decorrelated from the remote signal s(t). In another embodiment, the correlation or decorrelation of the remote signal s(t) and output signal y(t) is measured directly or inferred through other measurements (such as the overall cancellation gain). The appropriate delay is then computed from the computed correlation.

In the embodiment shown in FIG. 3A, the echo cancelled signal r"(t) before the gain stage 348 is used as the pilot signal or reference signal for channel estimation. In other embodiment, the output signal y(t) after gain stage 348 can be used as the pilot signal as well.

In the above described embodiments of the feedback delay control method of the present invention, the variable delay D1 is introduced to the post cancellation signal of the echo cancellation repeater. In other embodiments of the present invention, the feedback delay control method introduces a variable delay D1 in an echo cancellation repeater at any point in the feedforward portion of the repeater. In particular, in one embodiment, the variable delay D1 is introduced in the repeater circuit before the echo cancellation. Regardless of where delay D1 is introduced in the signal path of the echo cancellation repeater, the feedback delay control method of the present invention operates in the same manner to decorrelate the output signal y(t) from the remote signal s(t) to improve the channel estimation accuracy and thereby improve the repeater performance.

Figure 3B:
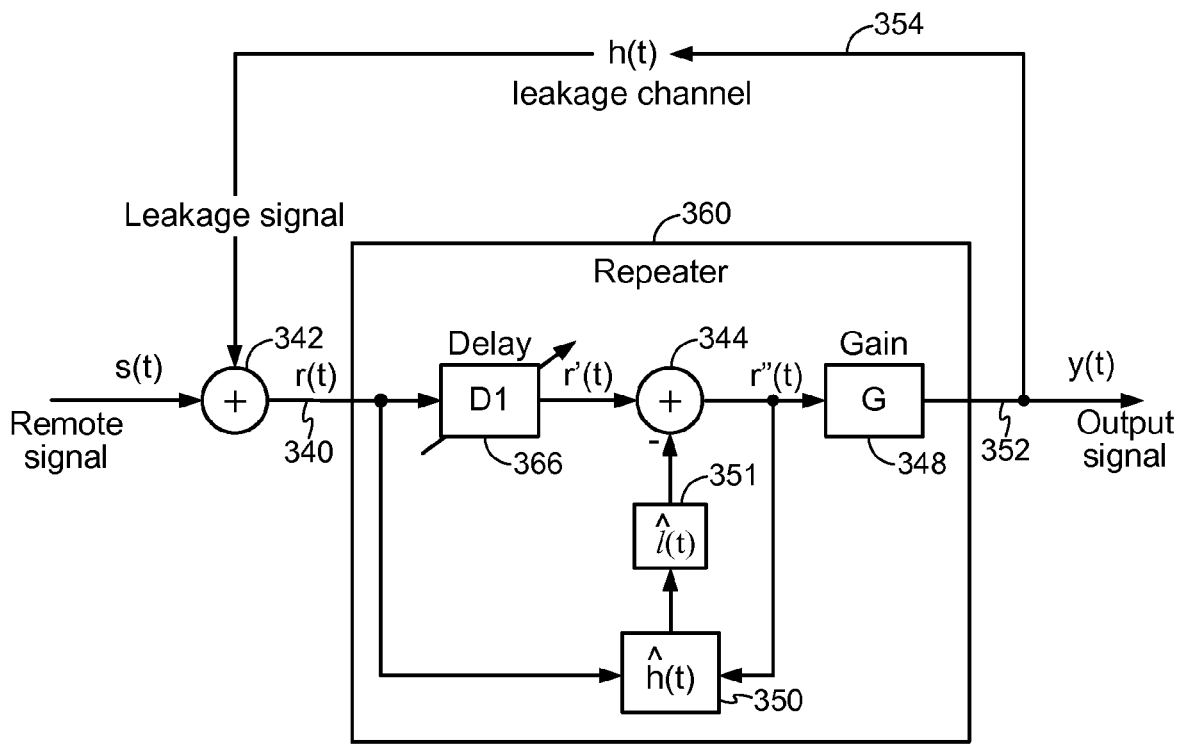
FIG. 3B is a block diagram of an echo cancellation repeater implementing feedback delay control according to an alternate embodiment of the present invention.

FIG. 3B is a block diagram of an echo cancellation repeater implementing feedback delay control according to an alternate embodiment of the present invention. Like elements in FIGS. 3A and 3B are given like reference numerals to simplify the discussion. Referring to FIG. 3B, a variable delay D1 is provided in an echo cancellation repeater 360 to introduce a delay in the pre-cancellation signal of the echo cancellation repeater. In the present embodiment, repeater 360 includes a delay element 366 in the signal path of the receive signal r(t) to introduce a delay D1 to the receive signal r(t). The delayed receive signal r'(t) is coupled to an echo canceller including a summer 344 and a feedback signal estimation block 351 working together with a channel estimation block 350. Summer 344 operates to subtract a feedback signal estimate $\hat{l}(t)$ from the delayed receive signal r'(t). The delayed echo cancelled signal r"(t) is coupled to gain stage 348 to generate the output signal y(t). The delayed echo cancelled signal r"(t) is also coupled to the channel estimation block 350 for use in channel estimation. In repeater 360, a certain amount of delay D1 is introduced between the output signal y(t), which is being fed back through the feedback channel h(t) as the feedback signal, and the remote signal s(t) in order to decorrelate the two signals. The value for variable delay D1 provided by delay element 366 can be selected in the same manner as described above with reference to FIG. 3A to obtain the desired amount of decorrelation. Furthermore, variable delay D1 in FIG. 3B can be tuned or adjusted in the same manner as described above with reference to FIG. 3A.

2. Pilot Delay Control

According to another aspect of the present invention, a pilot delay control method is implemented in an echo cancellation repeater to improve frequency domain channel estimation and echo cancellation performance. In particular, frequency domain channel estimation is sensitive to delays that are present in the feedback channel. To improve the accuracy of the channel estimation, a variable delay (D2) is introduced to the transmit signal and the delayed transmit signal is then supplied to the channel estimation algorithm to be used as the pilot signal or reference signal to compute the feedback channel estimate. The feedback channel estimate thus computed is supplied to the echo cancellation block for use in echo cancellation. The variable delay D2 effectively "left shifts" the feedback channel estimates and mitigates the loss of orthogonality effect when frequency domain channel estimation is used on RF signals that do not have a cyclic prefix. Details of the pilot delay control method in an echo cancellation repeater will be described in more detail below with reference to FIG. 4.

Figure 4:
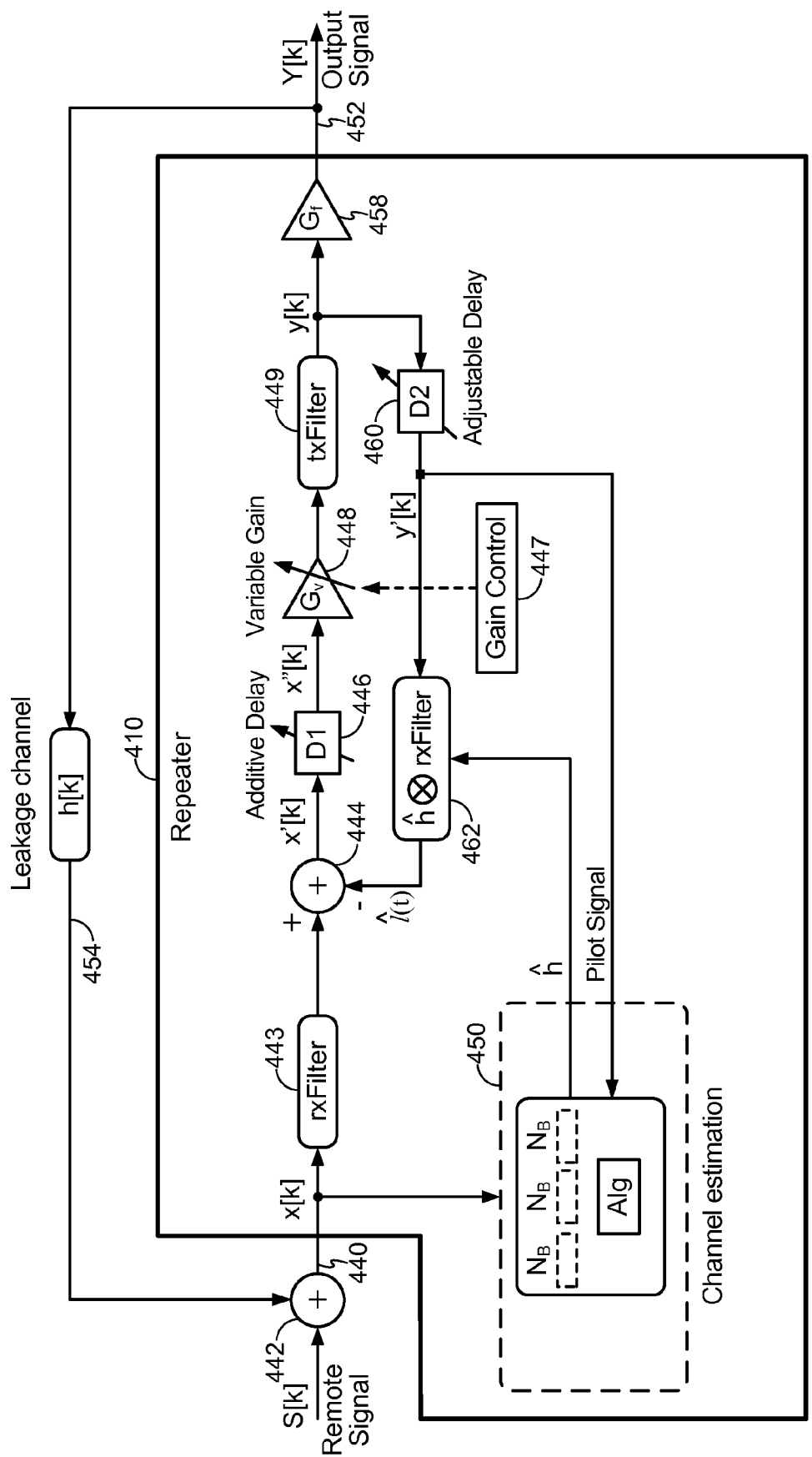
FIG. 4 is a block diagram of an echo cancellation repeater implementing pilot delay control according to one embodiment of the present invention.

FIG. 4 is a block diagram of an echo cancellation repeater implementing pilot delay control according to one embodiment of the present invention. Referring to FIG. 4, an echo cancellation repeater 410 receives a remote signal S[k] on a donor antenna (denoted as input node 440) to be repeated and generates an output signal Y[k] to be transmitted on a server antenna (denoted as output node 452). Signal leakage from the server antenna back to the donor antenna causes part of the output signal y(t) to be leaked back and added to the remote signal before being received by the repeater. The signal leakage goes through a feedback channel h[k], denoted as a signal path 454 between output node 452 and the input node 440. Thus, repeater 410 actually receives a receive signal x[k] being the sum of the remote signal S[k] and the feedback signal where the feedback signal is basically an attenuated version of the output signal Y[k]. Summer 442 in FIG. 4 is symbolic only to illustrate the signal components of receive signals and does not represent an actual signal summer in the operating environment of repeater 410. Repeater 410, being an echo cancellation repeater, operates to estimate the feedback signal in order to cancel out the undesired feedback signal component in the receive signal.

In the present description, the notations s(t) and S[k] are used interchangeably to refer to the remote signal. Similar notation scheme is also used for other signals described herein. It is understood that the two styles of notations merely refer to the signal in time domain or refer to the signal as time sequence of samples and the notations are merely different representation of the same signal In repeater 410, the receive signal x[k] ("the input signal") is coupled to a receive filter 442 ("rxFilter") and the filtered receive signal is coupled to a summer 444 which operates to subtract a feedback signal estimate $\hat{I}(t)$ from the filtered receive signal. As long as the feedback signal estimate is accurate, the undesired feedback signal is removed from the receive signal and echo cancellation is realized. The post cancellation signal x'[k] is coupled through a delay element 446 having a variable delay D1. Variable delay D1 is introduced in accordance with the feedback delay control method described above to reduce the correlation between the output signal and the remote signal, thereby improving the feedback channel estimate and repeater performance. Variable delay D1 is optional in the present embodiment and may be omitted in other embodiments of the present invention.

The post cancellation and delayed signal x"[k] is coupled to a variable gain stage 448 providing a variable gain of G. Variable gain stage 448 is controlled by a gain control block 447 for adjusting the gain value $G_v$ of repeater 410. The amplified signal is coupled to a transmit filter 449 ("txFilter") to generate a first output signal y[k]. The first output signal y[k] is then coupled to a final gain stage 458 providing a RF gain of $G_f$. Final gain stage 458 generates the amplified output signal Y[k] ("the amplified signal") on the output node 452.

Repeater 410 includes a channel estimation block 450 which operates to estimate the feedback channel h[k] and computes an estimate of the feedback signal for the purpose of echo cancellation. In the present embodiment, the echo cancelled output signal y[k] is used as the pilot signal or the reference signal for channel estimation. The output signal y[k] is subjected to an adjustable delay D2 which will be described in more detail below. Channel estimation block 450 also receives the receive signal x[k] as an input signal. Channel estimation block 450 computes the feedback channel estimate $\hat{h}$ using a predefined channel estimation algorithm (Alg) and stored coefficients $N_B$. The feedback channel estimate $\hat{h}$ as thus computed is coupled to a feedback signal estimate computation block 462. Feedback signal estimate computation block 462 performs a convolution of the feedback channel estimate $\hat{h}$ with the receive filter "rxFilter" and with the delayed pilot signal y'[k] to generate the feedback signal estimate $\hat{I}[k]$. The convolution uses the receive filter to ensure that the feedback signal estimate used for echo cancellation exhibit the same signal characteristics as the receive signal x[k] which is subjected to the same receive filter 443. The feedback signal estimate $\hat{I}[k]$ is coupled to summer 444 to be subtracted from the receive signal to realize echo cancellation of the receive signal.

According to one aspect of the present invention, the effective isolation is increased through baseband interference cancellation where the feedback signal is estimated and cancelled at baseband in the repeater device, as described above. Baseband interference cancellation thus allows the repeater gain to be increased. Accordingly, a very accurate feedback channel estimate is required for effective cancellation. In general, the more accurate the feedback channel estimate, the higher the cancellation and hence the higher the effective isolation.

Frequency domain channel estimation suffers degradation from lack of orthogonality if the signal being used as the pilot signal or the reference signal does not have a cyclic prefix. In an amplify and forward repeater such as repeater 410, the output signal y[k] is used as the reference signal and since the output signal y[k] has the same form as the input signal, i.e., the remote signal S[k], the reference signal for the channel estimation is unlikely to have the required structure (cyclic prefix). Frequency domain channel estimation in this environment suffers from various effects similar to those experienced in an OFDM system where the channel is longer than the cyclic prefix. In the extreme case under consideration here, the cyclic prefix is non-existent and the entire feedback channel acts as an excess delay spread channel. The degradation from such a scenario has been documented in the art. The degradation is particularly acute when the actual channel has a delay. To effectively apply frequency domain channel estimation for repeater feedback channel estimation, the issue of excess delay spread needs to be mitigated.

In frequency domain channel estimation, the output signal y(t) is used as the pilot signal and the remote signal s(t) is treated as noise. The feedback channel estimate $\hat{h}(t)$ is obtained through the following procedure. First, N consecutive samples of the pilot signal y[k] are subject to N points Fast Fourier Transform (FFT) to generate N samples denoted Y[n], n=0 ... N−1. Similarly, N consecutive samples of the receive signal x[k] are subject to N points FFT to generate N samples denoted X[n]. Second, a number 'P' of blocks of input samples and output samples are collected together. Each frequency domain sample is processed into sample Z[n] using the following equation:

$$Z[n] = \frac{\sum_{k=0}^{P-1} Y_k[n]^H X_k[n]}{\sum_{k=0}^{P} |Y_k[n]|^2},$$

where n indexes the tone and P is the block index. Finally, N samples of Z[n] are subjected to an N points Inverse Fourier Transform (IFFT) to obtain the feedback channel estimate $\hat{h}$.

In the present embodiment and as shown in FIG. 4, a delay element 460 providing an adjustable or variable delay D2 is introduced in the transmit signal y[k] and the delayed transmit signal y'[k] is used as the reference or pilot signal for channel estimation and for echo cancellation. Introducing the adjustable delay D2 has the effect of advancing the reference sequence used for channel estimation so that the effective feedback channel is 'left' shifted with respect to the channel before any adjustable delay is introduced. In other words, delay D2 has the effect of advancing the channel that is to be estimated.

Bulk delay in the feedback channel h[k] has the effect of increasing the effective "excess delay spread" of the channel. Variable delay D2 has the effect of calibrating out the bulk delay in the feedback channel, thereby minimizing the effects of excess delay spread on the feedback channel. By properly adjusting the delay D2, the impact of the loss of orthogonality in the input signal is greatly reduced, the channel estimation is improved and the performance of the repeater is also enhanced.

According to some embodiments of the present invention, the tunable delay D2 is adjusted when the repeater is started up and is tuned periodically when the repeater is in operation to account for changes in the delay characteristics of the feedback channel. In one embodiment, the delay D2 is tuned or adjusted by searching. That is, the delay D2 is adjusted until the desired gain and repeater performance are obtained.

3. Dual-Stage Echo Cancellation Using an Inserted Pilot

For a repeater using interference cancellation, the feedback channel needs to be estimated extremely accurately so that the feedback signal (or "leakage signal") can be estimated and subtracted out. In the above described embodiments, channel estimation is carried out using the transmitted (amplified) signal as the reference signal or the pilot signal. As thus configured, there is no control over the pilot structure and the channel estimation performance is subject to the structure of the signal being amplified. The channel estimation accuracy is particularly sensitive to the statistics of the amplified signal (dynamics, temporal correlation etc). In some scenarios, such as a large delay spread or the presence of multiple repeaters, an unknown pilot structure can limit achievable repeater gain.

According to some embodiments of the present invention, an echo cancellation repeater uses an inserted pilot for the purpose of channel estimation. That is, a known pilot signal is inserted into the desired transmitted signal of an echo cancellation repeater and the inserted pilot signal is used as the reference signal for channel estimation instead of using the transmitted signal as the reference signal. Using a known inserted pilot for channel estimation provides many advantages, including robustness to multipath delay spread from the base station, and robustness to interference from neighboring repeaters. In operation, the repeater transmits the desired transmitted signal plus the inserted pilot. The pilot is perceived as noise by devices receiving the composite transmitted signal from the repeater. To ensure that this perceived noise is low enough, the inserted pilot has a power level selected to be sufficiently lower than the power level of the desired transmitted signal. However, the power level of the pilot signal is also selected to be greater than background noise to ensure that the inserted pilot can be effectively used in channel estimation. In one embodiment, the power level of the pilot signal is selected to be lower than and a function of the desired transmitted signal. In another embodiment, the power level of the pilot signal is selected to be lower than and a function of the desired transmitted signal and the gain of the repeater.

For purposes of feedback channel estimation using the inserted pilot as the reference signal, the portion of the desired transmit signal fed back is treated as noise. The extent of averaging required to achieve the desired SINR on the channel estimate becomes prohibitive for any reasonable non-static channel. This severely limits the usability of an inserted pilot as a means to estimating the feedback channel. According to embodiments of the present invention, a dual-stage echo cancellation scheme is implemented in an echo cancellation repeater employing an inserted pilot for channel estimation. The two-stage cancellation scheme operates to minimize the amount of averaging necessary to obtain the desired SINR on the feedback channel estimate, thereby enabling the use of an inserted pilot for channel estimation in an echo cancellation repeater. Details of the dual-stage echo cancellation scheme in an echo cancellation repeater using an inserted pilot will be described in more detail below with reference to FIGS. 5 and 6.

Figure 5:
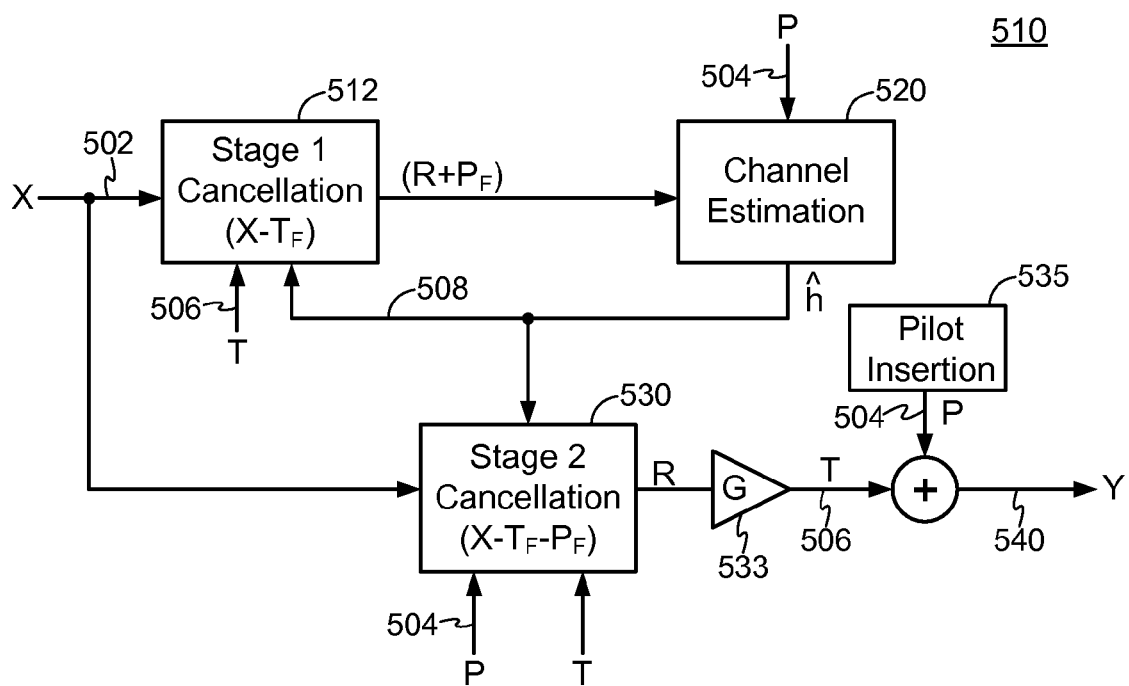
FIG. 5 is a block diagram of a repeater implementing dual-stage echo cancellation employing an inserted pilot according to one embodiment of the present invention.
Figure 6:
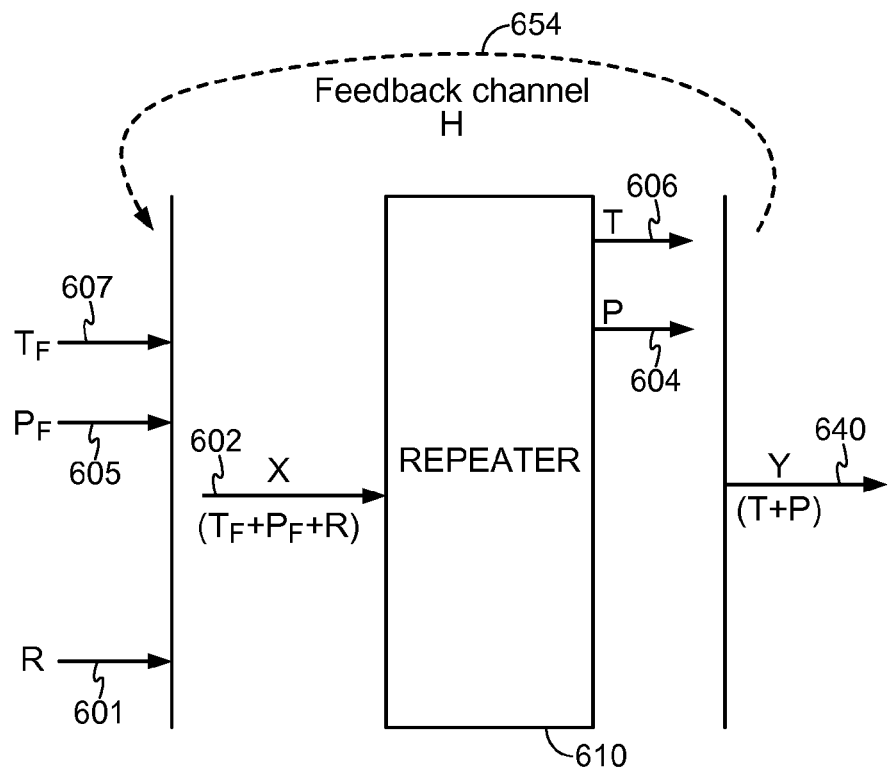
FIG. 6 depicts the power levels of the input, output and feedback signals of a repeater employing inserted pilot according to one embodiment of the present invention.

FIG. 5 is a block diagram of a repeater implementing dual-stage echo cancellation employing an inserted pilot according to one embodiment of the present invention. FIG. 6 depicts the power levels of the input, output and feedback signals of a repeater employing inserted pilot according to one embodiment of the present invention. Referring first to FIG. 6, when an inserted pilot is used, the input signal received by the repeater 610 (denoted signal "X") becomes the remote signal (R) plus the feedback transmit signal ($T_F$) plus the feedback pilot signal ($P_F$). That is, $X=T_F+P_F+R$. The output signal of the repeater 610, or the amplified signal being transmitted by the repeater, (denoted signal "Y") is the desired transmitted signal T plus the pilot signal P. That is, $Y=T+P$.

The dual-stage echo cancellation scheme of the present invention will now be described with reference to FIG. 5. Referring to FIG. 5, a repeater 510 implementing the dual-stage echo cancellation scheme includes a first echo canceller 512 for carrying out the stage 1 echo cancellation and a second echo canceller 530 for carrying out the stage 2 echo cancellation. The first echo canceller 512 receives the receive signal X (node 502) and the transmit signal T (node 506) as input signals. The first echo canceller 512 also receives a currently available feedback channel estimate ĥ (node 508) from the channel estimation block 520. The currently available feedback channel estimate can be a reasonable feedback channel estimate or the last feedback channel estimate ĥ from the channel estimation block 520. The currently available feedback channel estimate is used to predict the feedback transmit signal $T_F$. The predicted feedback transmit signal $T_F$ is essentially the desired transmitted signal T convolved with the latest feedback channel estimate ĥ. In first echo canceller 512, the feedback transmit signal $T_F$, as thus predicted and reconstructed, is subtracted from the received signal X, leaving only the remote signal R and the feedback pilot signal $P_F$. In practice, there may be some noise associated with the first echo cancellation and the result is not exactly, but very close to, $R+P_F$. The feedback pilot signal $P_F$ is the inserted pilot convolved with the feedback channel. The modified received signal ($R+P_F$), along with the inserted pilot P, is then provided to the channel estimation block 520 and used for channel estimation to obtain an updated feedback channel estimate ĥ. Because the inserted pilot is completely uncorrelated with the remote signal, a very accurate feedback channel estimate is obtained.

Then, proceeding to the stage 2 echo cancellation (second echo canceller 530) of the dual-stage echo cancellation scheme, the updated feedback channel estimate ĥ is used to predict the feedback transmit signal $T_F$ and the feedback pilot signal $P_F$. To that end, second echo canceller 530 receives the receive signal X (node 502), the transmit signal (node 506) and the pilot signal P (node 504). The second echo canceller 530 also receives the updated feedback channel estimate ĥ from channel estimation block 520. The second echo canceller 530 computes a more accurate prediction of the feedback transmit signal $T_F$ using the updated feedback channel estimate ĥ. The predicted feedback transmit signal $T_F$ and the feedback pilot signal $P_F$ are reconstructed and subtracted from the received signal X to yield just the remote signal R. After amplification by the repeater, such as through gain block 533 with a gain of G, an echo cancelled amplified remote signal T with high accuracy is obtained. In repeater 510, the desired transmitted signal T is added with the pilot signal P, generated by a pilot insertion unit 535, and then transmitted out of the repeater as the composite transmit signal Y which is $T+P$.

In another embodiment, the two cancellation stages are repeated iteratively with the first stage using the latest feedback channel estimate used by the second stage as the currently available channel estimate. The channel estimation block generates updated feedback channel estimates on a continuous basis based on the new incoming samples of the receive signals. Highly accurate echo cancellation and high repeater gain can be achieved by using the dual-stage echo cancellation method with an inserted pilot in accordance with the present invention.

Referring again to FIG. 6, assume that repeater 610 amplifies the received remote signal R by 70 dB, and inserts a pilot P with power 20 dB lower than the amplified remote signal T. Assuming there is a 40 dB of isolation between donor and coverage antennas, the inserted pilot leaks back ($P_F$) with a power level that is 10 dB above the remote signal, and the desired transmitted signal leaks back ($T_F$) at a power level 30 dB above the remote signal. Let us assume that the channel estimation SINR is required to be close to 50 dB for tolerable residual cancellation error. With an one stage cancellation approach, the initial SINR of the channel is −20, (since the inserted pilot is 20 dB lower than the desired transmitted signal, which acts as noise), and hence since the target SINR is 50 dB, there needs to be 70 dB of additional processing gain (a large part of it through increased averaging) to get to the desired channel estimation SINR. With a two stage cancellation approach, the feedback transmitted signal $T_F$ is first subtracted out, so the initial SINR of the channel is 10 dB, and hence there needs to be only 40 dB of processing gain. Thus the two stage cancellation enables the amount of additional averaging to be about equal to the difference in transmit power levels of the inserted pilot and the desired transmit signal (20 dB). The reduction in required averaging enables the inserted pilot approach to be robust to apply in repeaters even with feedback channel temporal variations.

Figure 7:
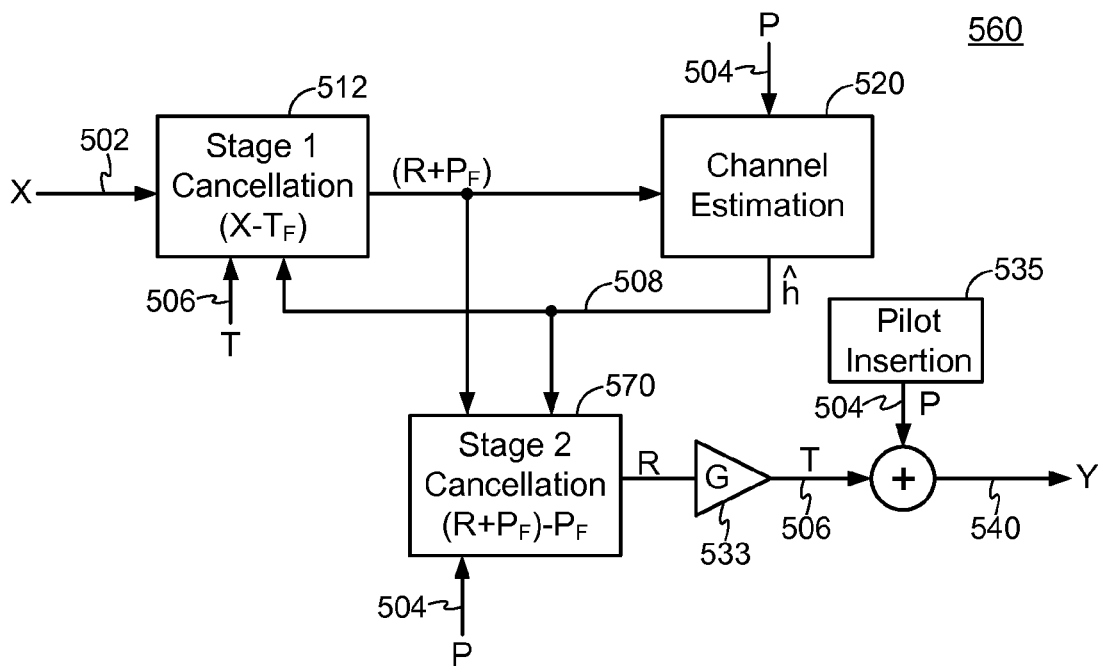
FIG. 7 is a block diagram of a repeater implementing dual-stage echo cancellation employing an inserted pilot according to an alternate embodiment of the present invention.

In the above described embodiment, the dual-stage echo cancellation scheme cancels the feedback transmit signal $T_F$ in the first stage to obtain a more accurate channel estimation and then using the updated feedback channel estimation, the dual-stage echo cancellation scheme cancels the feedback transmit signal $T_F$ and the feedback pilot signal $P_F$ in the second stage to obtain the remote signal. Other cancellation schemes are possible to realize echo cancellation in a repeater using an inserted pilot. FIG. 7 is a block diagram of a repeater implementing dual-stage echo cancellation employing an inserted pilot according to an alternate embodiment of the present invention. Like elements in FIG. 5 and FIG. 7 are given like reference numerals to simplify the discussion.

Referring to FIG. 7, a repeater 560 implementing the dual-stage echo cancellation scheme in accordance with the present invention includes a first echo canceller 512 for carrying out the stage 1 echo cancellation and a second echo canceller 570 for carrying out the stage 2 echo cancellation. The first echo canceller 512 receives the receive signal X (node 502) and the transmit signal T (node 506) as input signals. The first echo canceller 512 also receives a currently available feedback channel estimate ĥ from the channel estimation block 520. The currently available feedback channel estimate can be a reasonable feedback channel estimate or the last feedback channel estimate ĥ from the channel estimation block 520. The currently available feedback channel estimate is used to predict the feedback transmit signal $T_F$. In first echo canceller 512, the feedback transmit signal $T_F$, as thus predicted and reconstructed, is subtracted from the received signal X, leaving only the remote signal R and the feedback pilot signal $P_F$ as the first echo cancelled signal. The feedback pilot signal $P_F$ is the inserted pilot convolved with the feedback channel. The first echo cancelled signal (R+$P_F$), along with the inserted pilot P, is then provided to the channel estimation block 520 and used for channel estimation to obtain an updated feedback channel estimate ĥ. Because the inserted pilot is completely uncorrelated with the remote signal, a very accurate feedback channel estimate is obtained.

Then, at stage 2 echo cancellation, the second echo canceller 570 receives the first echo cancelled signal (R+$P_F$) from the first echo canceller 512. The second echo canceller 570 also receives the pilot signal and the updated feedback channel estimate. The second echo canceller 570 uses the updated feedback channel estimate ĥ to predict the feedback pilot signal $P_F$. The predicted feedback pilot signal $P_F$ is reconstructed and subtracted from the first echo cancelled signal (R+$P_F$) to yield just the remote signal R. After amplification by the repeater, such as through gain block 533 with a gain of G, an echo cancelled amplified remote signal T with high accuracy is obtained. In repeater 560, the desired transmitted signal T is added with the pilot signal P, generated by a pilot insertion unit 535, and then transmitted out of the repeater as the composite transmit signal Y which is T+P.

The dual-stage echo cancellation scheme implemented in FIG. 7 is simplified as compared to the dual-stage echo cancellation scheme implemented in FIG. 5 as the second echo canceller only predicts and cancels the feedback pilot signal. Although the dual-stage echo cancellation scheme implemented in FIG. 7 can be slightly inaccurate as the feedback transmit signal $T_F$ is predicted using the currently available feedback channel estimate which may or may not be the most accurate or most updated feedback channel estimate. However, in most cases, the dual-stage echo cancellation scheme of FIG. 7 will provide sufficiently accurate results. Furthermore, when the two cancellation stages are repeated iteratively with the first stage using the latest feedback channel estimate used by the second stage as the currently available channel estimate, the accuracy of the echo cancellation can be greatly improved.

4. Inserted Pilot Construction

For a repeater using interference cancellation, the feedback channel needs to be estimated extremely accurately so that the feedback/leakage signal can be subtracted out. There are some advantages to using an inserted pilot for the purposes of feedback channel estimation, including robustness to multipath delay spread from the base station, and robustness to interference from neighboring repeaters. In the present description, only downlink transmission of a repeater is discussed but the discussion applies to uplink transmission as well. When an inserted pilot is used, the repeater transmits the desired transmitted signal (the amplified remote signal) plus the inserted pilot. The pilot is perceived as noise by devices receiving the composite transmitted signal from the repeater.

In some embodiments of the present invention, a structure for an inserted pilot and a method for constructing an inserted pilot for use in an echo cancellation repeater for channel estimation are provided. When constructed in accordance with the method herein, the inserted pilot has the desired power, spectral characteristics and data structure that are advantageous for channel estimation. In some embodiments, since the pilot is to be perceived as noise by the end device, the power level of the pilot signal is controlled with respect to the power of the transmitted signal so that the pilot power will not introduce distortion. In other embodiments, the pilot is constructed so that it has the same spectral characteristics as the amplified signal. Finally, in other embodiments, the pilot is constructed to have properties and a data structure that is helpful for channel estimation procedure. In one embodiment, the pilot is constructed using an OFDM structure with a cyclic prefix.

Figure 8:
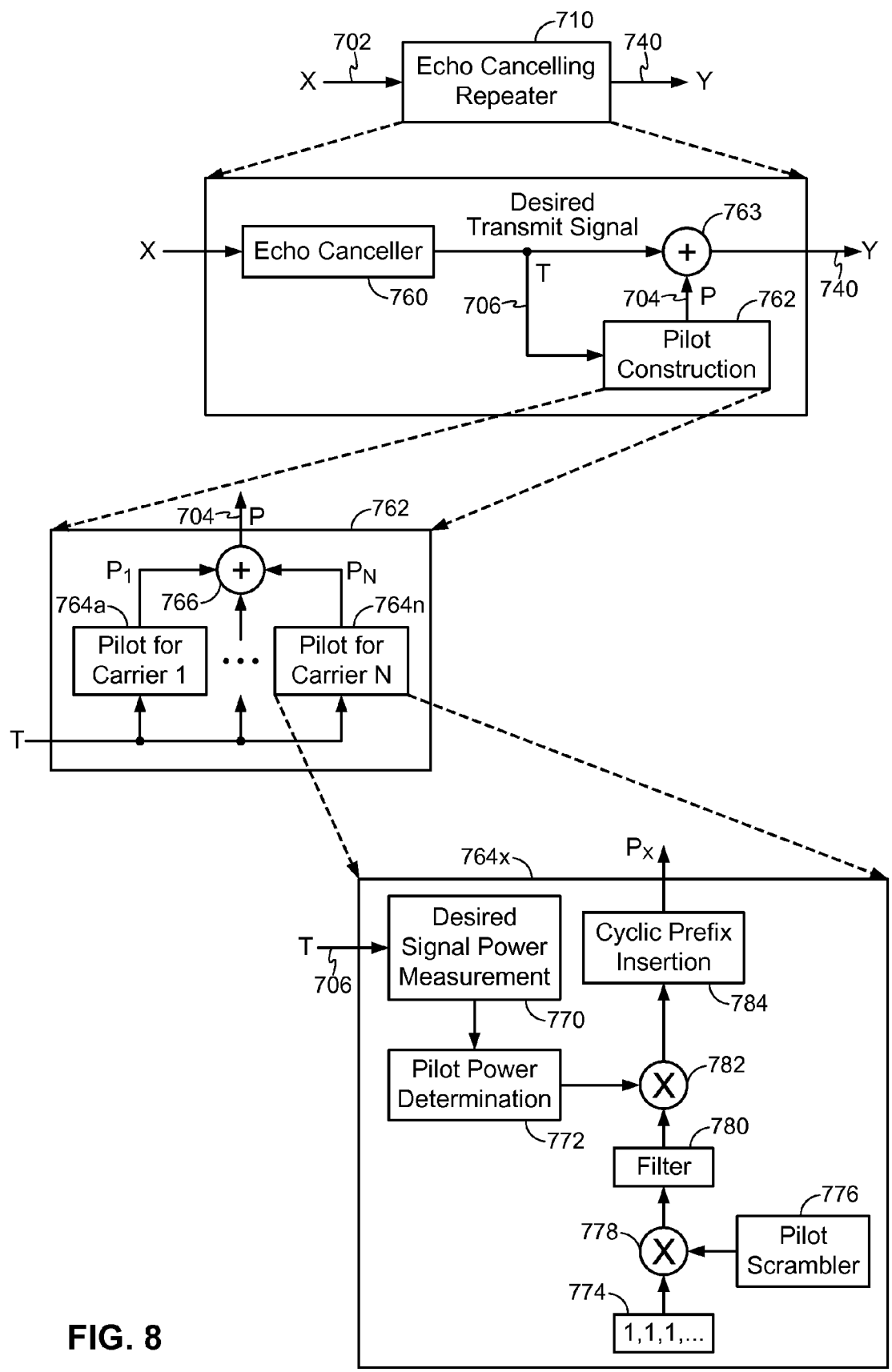
FIG. 8 is a block diagram of a repeater and a pilot construction system according to one embodiment of the present invention.

FIG. 8 is a block diagram of a repeater and a pilot construction system according to one embodiment of the present invention. An echo cancelling repeater 710 receives a receive signal or an input signal X (node 702) and generates an output signal or amplified signal Y (node 740) to be transmitted. In the echo cancelling repeater 710, a pilot construction unit 762 is provided to introduce a pilot P to the output signal Y. More specifically, in repeater 710, an echo canceller 760 generates the desired transmit signal T from the received signal X. The pilot P (node 704), generated by pilot construction unit 762, is added to the desired transmit signal T (summer 763) to generate the output signal Y, such that Y=T+P. The detail of the pilot construction system is further illustrated in FIG. 8. In the present illustration, the transmit signal is assumed to be a multi-carrier signal and therefore, the pilot signal is constructed as a multi-carrier signal with N carriers. The pilot signal can of course be constructed as a single carrier signal as well, such as when the transmit signal is a single carrier signal.

In the case of a multi-carrier signal, the pilot construction unit 762 includes pilot generators 764*a* to 764*n* for each of carriers 1 to N. A carrier pilot signal $P_1$ to $P_N$ is generated for each carrier and the carrier pilot signals $P_1$ to $P_N$ are summed together (summer 766) to form the pilot signal P. The pilot signal for a given carrier is generated as follows.

According to one embodiment of the present invention, a pilot generator 764*x*, representative of any one of pilot generators 764*a* to 764*n*, constructs the inserted pilot P using an OFDM data structure with a cyclic prefix. The use of an OFDM data structure with a cyclic prefix has particular beneficial features for feedback channel estimation when FFT/IFFT algorithms (frequency domain channel estimation) are used. In particular, the power distribution across tones could be optimized as desired (e.g. a single tone or a group of tones can be hopped across the band). In pilot generator 764*x*, a pilot symbol unit 774 provides the symbols for the OFDM data structure. In other embodiments, other data structure for the inserted pilot can be used.

The pilot symbols having the OFDM structure may be scrambled using a pre-determined seed or scrambling sequence. In pilot generator 764*x*, a pilot scrambler 776 provides the scrambling sequence to scramble the OFDM data symbols provided by the pilot symbol unit 774 at a multiplier 778. The scrambling sequence may impart a unique identifier to the repeater. Then, for each carrier being amplified, the pilot is shaped by a filter 780 with the desired spectral properties. In one embodiment, the pilot is shaped by passing white noise through a filter imitating the transmit filter.

In order to maintain the correct power for the pilot signal, the power of the desired transmitted signal T (node 706) is first estimated through power measurement and filtering unit 770. The power of the pilot signal is determined and set to the desired level with respect to the desired transmit signal power at a pilot power determination unit 772. Typically, the power level of the pilot signal is set to be lower than the power level of the transmit signal. In one embodiment, the pilot signal power is 20 dB lower than the transmit signal power. The power of the filtered pilot is set at multiplier 782. When the desired transmit signal consists of multiple carriers, the power of the desired transmit signal in each carrier is measured and estimated. After the power level of the pilot signal is established (multiplier 782), a cyclic prefix is inserted at cyclic prefix insertion unit to generate the pilot signal Px for the specific carrier.

The pilot construction system described herein has the following advantages. First, frequency domain channel estimation is desirable in terms of complexity, and if a cyclic prefix is used, there is minimal inter-symbol interference (ISI) and inter-carrier interference (ICI). Hence, using a pilot with an OFDM structure including a cyclic prefix reduces the overall complexity of the channel estimation and has no drawbacks in terms of the repeater performance.

Second, filtering the pilot with same filter as the one already being used to shape the desired transmitted signal (the transmit filter) is advantageous because an additional filter is not required, and because it ensures that the pilot does not have undesirable spectral components. The pilot can be generated before the repeater begins to amplify the incoming signal, hence during repeater operation the transmit filter would only be used for shaping the output signal, not for shaping the pilot.

Third, it is critical to maintain the pilot power at a given amount below the power of the desired transmit signal so that the output SINR is not unnecessarily degraded. Using a filter to track the power of the desired transmit signal, and basing the pilot power off of this filtered value has the advantage that the filter coefficient can be tuned so that the pilot power effectively tracks the desired signal power, while the repeater remaining relatively stable. Furthermore, constructing an inserted pilot on a per carrier basis has the advantage that the pilot power will track the desired signal power across frequency.

Finally, using a pre-determined seed for scrambling the pilot symbols allows the inserted pilot to be used as a reference by other repeaters (or devices) to detect the presence of a repeater. The pilot may also be used to signal useful information to other repeaters/devices in the vicinity (e.g. transmit power/gain).

Figure 9:
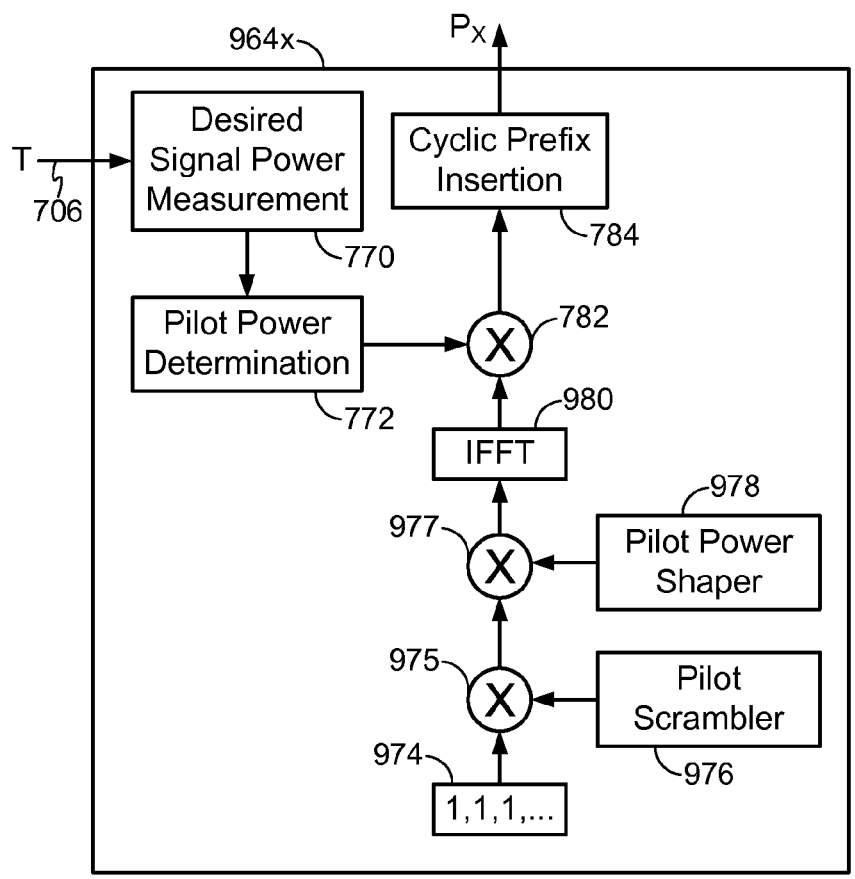
FIG. 9 is a block diagram of a pilot generator according to an alternate embodiment of the present invention.

In the above description, the pilot generator 764*x* implements time domain pilot construction scheme. According to another aspect of the present invention, a frequency domain pilot construction scheme is used to construct the inserted pilot for use in a repeater. FIG. 9 is a block diagram of a pilot generator according to an alternate embodiment of the present invention. Referring to FIG. 9, a pilot generator 964*x* can be used to implement any one of pilot generators 764*a* to 764*n* in FIG. 8.

Under the frequency domain pilot construction scheme, a pilot symbol unit 974 provides a block of M data symbols in frequency domain where one data symbol is provided for each tone. Then, the data symbols are scrambled by a pilot scrambler 976. More specifically, the pilot scrambler 976 scrambles the data symbols at a multiplier 975 using a pre-determined scrambling sequence. In one embodiment, the scrambling sequence may impart a unique identifier to the repeater. Then, a pilot power shaper unit 978, through a multiplier 977, provides scaling of the scrambled symbols to adjust the power of the data symbols across all M tones. More specifically, the power of each data symbol may be different across tones to shape the frequency domain power spectrum. Then, the data symbols are provided to an IFFT (Inverse Fast Fourier Transform) filter 980 to translate the data symbols to a time domain signal.

The subsequent operation of pilot generator 964*x* is the same as pilot generator 764*x* of FIG. 8. First, in order to maintain the correct power for the pilot signal, the power of the desired transmitted signal T (node 706) is first estimated through power measurement and filtering unit 770. The power of the pilot signal (the average power and the power of the pilot signal across the tones) is determined and set to the desired level relative to the desired transmit signal power at a pilot power determination unit 772. Typically, the power level of the pilot signal is set to be lower than the power level of the transmit signal. The power of the pilot signal is set at multiplier 782. When the desired transmit signal consists of multiple carriers, the power of the desired transmit signal in each carrier is measured and estimated. After the power level of the pilot signal is established (multiplier 782), a cyclic prefix is inserted at cyclic prefix insertion unit to generate the pilot signal Px for the specific carrier.

5. Wideband Echo Cancellation

According to another aspect of the present invention, a wireless repeater implements wideband echo cancellation and digital gain control to achieve stability and improved repeater performance. More specifically, the repeater employs time domain echo cancellation to realize wideband echo cancellation, frequency domain channel estimation with an adjustable and an adaptive delay to improve channel estimation performance, and digital gain control to monitor and maintain repeater operational stability through baseband gain modifications. As thus configured, a wireless repeater capable of wideband echo cancellation, improved channel estimation performance and improved stability is realized.

Figure 10:
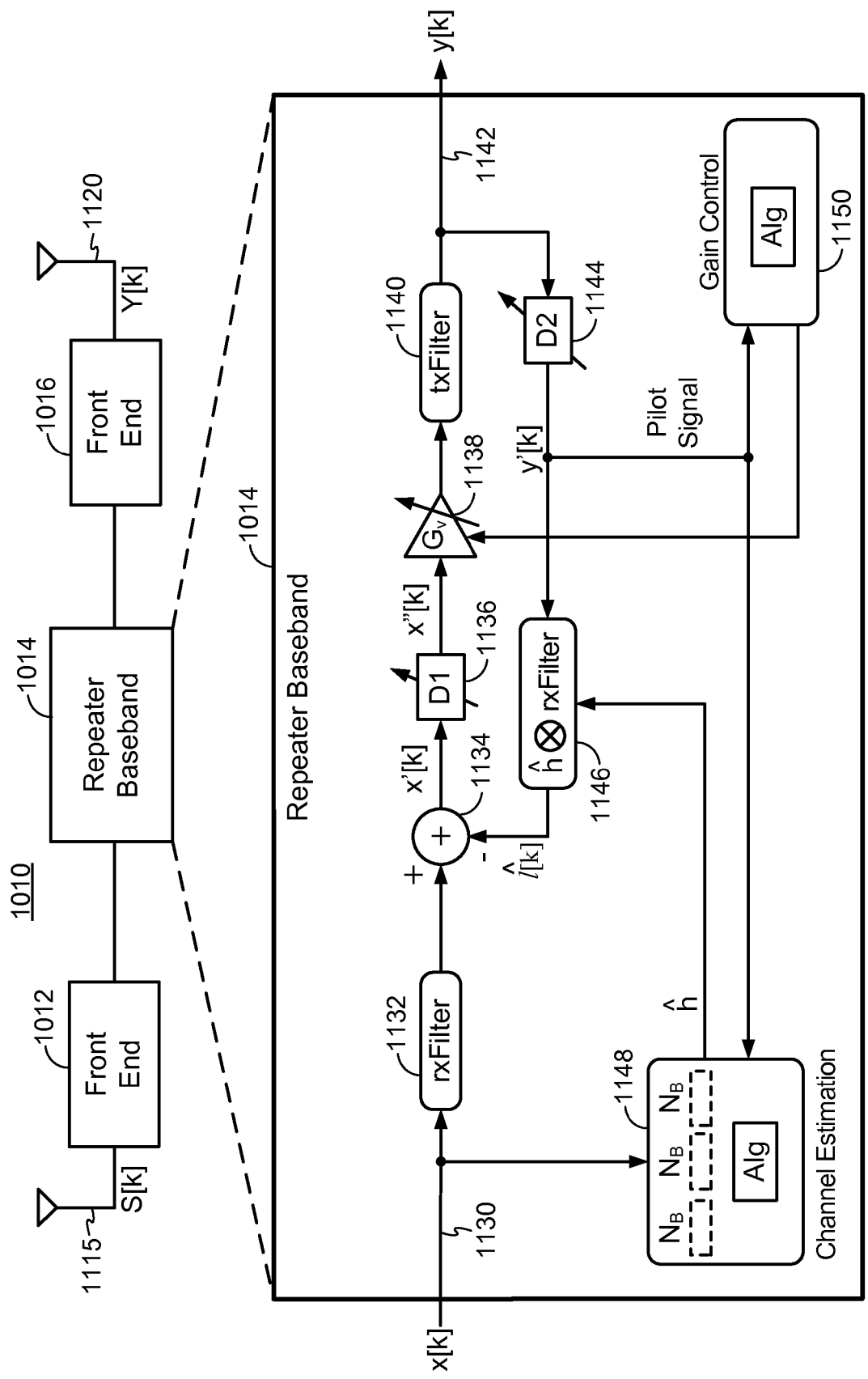
FIG. 10 is a block diagram of a repeater implementing wideband echo cancellation according to one embodiment of the present invention.

FIG. 10 is a block diagram of a repeater implementing wideband echo cancellation according to one embodiment of the present invention. Referring to FIG. 10, an echo cancellation repeater 1010 receives a remote signal S[k] on a first antenna 1115 to be repeated and generates an output signal Y[k] to be transmitted on a second antenna 1120. Repeater 1010 includes a first front-end circuit 1012 coupled to the first antenna 1115, a second front-end circuit 1016 coupled to the second antenna 1120, and a repeater baseband block 1014 coupled between the first and second front-end circuits. Note that repeater 1010 is configured so the circuitry (e.g., first front-end circuit 1012, second front-end circuit 1016) can be coupled to the appropriate antenna for the particular communication (forward or reverse link).

The first and second front-end circuits 1012, 1016 incorporate digital and analog front-end processing circuitry for implementing the receive and transmit functions of the wireless repeater. Basically, the first and second front-end circuits 1012, 1016 include circuitry of repeater 1010 that are outside of the repeater baseband block 1014. In one embodiment, the first and second front-end circuits 1012, 1016 each include digital and analog front-end processing circuitry used in conventional wireless receivers and transmitters. The receiver/transmitter front-end processing circuitry can include variable gain amplifiers, filters, mixers, drivers and digital signal processors. The specific implementation of the repeater front-end circuits 1012, 1016 is not critical to the practice of the present invention and any receiver/transmitter front-end processing circuitry, presently known or to be developed, can be applied in the wireless repeater of the present invention.

Repeater 1010 includes repeater baseband block 1014 where channel estimation, baseband echo cancellation, and gain control operations are implemented. Details of the repeater baseband block 1014 are illustrated in FIG. 10. Repeater baseband block 1014 receives a receive signal x[k] and generates an output signal y[k]. The receive signal x[k] is the sum of the remote signal S[k] to be repeated and a feedback signal resulting from a feedback channel between the first antenna 1115 and the second antenna 1120. In operation, signal leakage from the server antenna back to the donor antenna causes part of the output signal Y[k] to be leaked back through a feedback channel and added to the remote signal S[k] before the signal is received by the repeater. Thus, repeater 1010 actually receives a receive signal x[k] being the sum of the remote signal S[k] and the feedback signal where the feedback signal is basically an attenuated version of the output signal Y[k]. Repeater 1010, being an echo cancellation repeater, operates to estimate the feedback signal in order to cancel out the undesired feedback signal component in the receive signal.

In repeater baseband block 1014, the receive signal x[k] ("the input signal") on input node 1130 is coupled to a receive filter 1132 ("rxFilter"). In one embodiment, receive filter 1132 is a tunable, digital baseband receive filter to enable appropriate filtering of the received waveform. Furthermore, receive filtering enables selective amplification of the received waveform.

The filtered receive signal is coupled to an echo canceller implementing time domain echo cancellation. Time domain echo cancellation has the advantage of enabling wideband (i.e., large bandwidth) feedback signal cancellation while maintaining a small amount of delay through the repeater. In the present embodiment, the echo canceller includes a summer 1134 which operates to subtract a feedback signal estimate Î[k] from the filtered receive signal. As long as the feedback signal estimate Î[k] is accurate, the undesired feedback signal is removed from the receive signal and echo cancellation is realized. The feedback signal estimate Î[k] is generated by a channel estimation block to be described in more detail below.

The post cancellation signal x'[k] is coupled through an adaptive delay element 1136 having a variable delay D1. Variable delay D1 is introduced in accordance with the feedback delay control method described above to control the repeater delay and to fine tune channel estimation performance. More specifically, variable delay D1 is adaptively introduced to reduce the correlation between the output signal Y[k] and the remote signal S[k], thereby improving the feedback channel estimate and repeater performance. In the present embodiment variable delay D1 is introduced after echo cancellation. In other embodiments, the variable delay D1 is introduced at any point in the feed forward portion of the repeater. In particular, in one embodiment, the variable delay D1 is introduced in the repeater circuit before the echo cancellation.

The post cancellation and delayed signal x"[k] is coupled to a variable gain stage 1138 providing a variable gain of $G_v$. Variable gain stage 1138 is controlled by a gain control block 1150 for adjusting the gain of repeater 1010 through baseband gain modifications. In the present embodiment, gain control block 1150 implements digital gain control and receives a delayed echo cancelled output signal y'[k] as the pilot signal. Gain control block 1150 monitors the pilot signal and determine the stability of repeater 1010 through one or more gain control metrics. Gain control block 1150 adjusts the gain value $G_v$ of variable gain stage 1138 in a manner so as to maintain the operational stability of repeater 1010. Gain control block 1150 is capable of providing fast oscillation detection to ensure that the stability of the repeater is well controlled.

The amplified echo cancelled signal is coupled to a transmit filter 1140 ("txFilter") to generate an output signal y[k] on an output node 1142. In one embodiment, transmit filter 1140 is a tunable, digital baseband transmit filter to enable appropriate filtering of the transmitted waveform. The output signal y[k] from repeater baseband block 1014 is coupled to the second front-end circuit 1016 to be transmitted onto second antenna 1120 as the final output signal Y[k].

Repeater baseband block 1014 includes a channel estimation block which operates to estimate the feedback channel, denoted h[k], and computes an estimate of the feedback signal for the purpose of echo cancellation. In the present embodiment, the channel estimation block includes a channel estimation circuit 1148. The echo canceller includes a feedback signal estimate computation block 1146 which uses the feedback channel estimate from the channel estimation circuit 1148 to compute the feedback signal estimate. The echo cancelled output signal y[k] is used as the pilot signal or the reference signal for channel estimation, for feedback signal estimation and also for the digital gain control. In the present embodiment, the output signal y[k] is subjected to an adjustable delay D2 provided by an adjustable delay element 1144. Adjustable delay D2 is introduced in accordance with the pilot delay control method described above and has the effect of advancing the reference sequence used for channel estimation so that the effective feedback channel is 'left' shifted with respect to the channel before any adjustable delay is introduced. In other words, delay D2 has the effect of advancing the channel that is to be estimated. The benefits of introducing adjustable delay D2 are described above and in general, advancing the channel to be estimated through delay D2 improves the repeater performance by calibrating out the bulk delay in the feedback channel.

In repeater baseband block 1014, channel estimation circuit 1148 receives the delayed echo cancelled signal y'[k] as a pilot signal and also receives the receive signal x[k] as an input signal. Channel estimation circuit 1148 computes a feedback channel estimate ĥ using a predefined channel estimation algorithm (Alg) and stored coefficients $N_B$. In one embodiment, channel estimation circuit 1148 employs frequency domain channel estimation. The feedback channel estimate ĥ as thus computed is coupled to the feedback signal estimate computation block 1146. Feedback signal estimate computation block 1146 performs a convolution of the feedback channel estimate ĥ with the receive filter "rxFilter" and with the pilot signal y'[k] to generate the feedback-signal estimate Î[k]. The convolution uses the receive filter to ensure that the feedback signal estimate used for echo cancellation exhibit the same signal characteristics as the receive signal x[k] which is subjected to the same receive filter 443. The feedback signal estimate Î[k] is coupled to summer 1134 to be subtracted from the receive signal to realize echo cancellation of the receive signal.

As thus constructed, repeater 1010 increases the effective isolation between the donor antenna and the server antenna through baseband interference cancellation. The increased decorrelation between the output signal and the remote signal through the use of adaptive delay D1 and the delayed pilot signal used for channel estimation, feedback signal estimation and gain control (delay D2) operate to improve the channel estimation performance, thereby improving the baseband interference cancellation accuracy. Accurate baseband interference cancellation allows the repeater gain to be increased. With accurate wideband echo cancellation, repeater 1010 is capable of being operated at a high gain level as compared to conventional repeater devices.

In the embodiment shown in FIG. 10, elements of the repeater baseband block 1014 assumed a given arrangement. For instance, the adaptive delay element 1136 is followed by the variable gain stage 1138 and then followed by the transmit filter 1140. In other embodiments of the present invention, the elements of repeater baseband block 1014 can assume other configurations to realize the same channel estimation and echo cancellation functions. The exact order of arrangement of the elements in repeater baseband block 1014 is not critical to the practice of the present invention. In one embodiment, variable gain stage 1138 is placed after transmit filter 1140. In another embodiment, adaptive delay element 1136 is placed after variable gain stage 1138 or after transmit filter 1140. That is, adaptive delay element 1136 can be placed anywhere in the post cancellation signal path. Furthermore, in other embodiments, adaptive delay element 1136 can also be placed in the feedforward portion of the repeater, before echo cancellation.

In one embodiment, the remote signal has multiple carriers and the receive filter 1132 and the transmit filter 1140 are tuned to provide either narrow band or wideband echo cancellation.

Those skilled in the art will understand that information and signals may be represented using any of a variety of different technologies and techniques. For example: data, information, signals, bits, symbols, chips, instructions, and commands may be referenced throughout the above description. These may be represented by voltages, currents, electromagnetic waves, magnetic fields or particles, optical fields or particles, or any combination thereof.

In one or more of the above-described embodiments, the functions and processes described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. The term "control logic" used herein applies to software (in which functionality is implemented by instructions stored on a machine-readable medium to be executed using a processor), hardware (in which functionality is implemented using circuitry (such as logic gates), where the circuitry is configured to provide particular output for particular input, and firmware (in which functionality is implemented using re-programmable circuitry), and also applies to combinations of one or more of software, hardware, and firmware.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a memory, for example the memory of mobile station or a repeater, and executed by a processor, for example the microprocessor of modem. Memory may be implemented within the processor or external to the processor. As used herein the term "memory" refers to any type of long term, short term, volatile, nonvolatile, or other memory and is not to be limited to any particular type of memory or number of memories, or type of media upon which memory is stored.

Also, computer instructions/code may be transmitted via signals over physical transmission media from a transmitter to a receiver. For example, if the software is transmitted from a website, server, or other remote source using a coaxial cable, fiber optic cable, twisted pair, digital subscriber line (DSL), or physical components of wireless technologies such as infrared, radio, and microwave. Combinations of the above should also be included within the scope of physical transmission media.

Moreover, the previous description of the disclosed implementations is provided to enable any person skilled in the art to make or use the present invention. Various modifications to these implementations will be readily apparent to those skilled in the art, and the generic principles defined herein may be applied to other implementations without departing from the spirit or scope of the invention. Thus, the present invention is not intended to be limited to the features shown herein but is to be accorded the widest scope consistent with the principles and novel features disclosed herein.

What is claimed is:

1. A wireless repeater having a first antenna and a second antenna, the repeater comprising:
   a pilot insertion unit configured to generate a pilot signal, the pilot signal to be added to a transmit signal for transmission as a composite transmit signal;
   a first echo canceller to receive a receive signal and the transmit signal and generate a first echo cancelled signal using a currently available feedback channel estimate, the receive signal being the sum of a remote signal to be amplified, a feedback pilot signal and a feedback transmit signal, the feedback pilot signal and the feedback transmit signal being feedback signals fed back on a feedback channel between the first antenna and the second antenna, the first echo canceller configured to use the currently available feedback channel estimate to remove the feedback transmit signal from the receive signal;
   a channel estimation block to receive the first echo cancelled signal and also to receive the pilot signal as a reference signal, the channel estimation block configured to generate an updated feedback channel estimate based on the first echo cancelled signal and the reference signal;
   a second echo canceller to receive the receive signal, the pilot signal and the transmit signal and to generate a second echo cancelled signal using the updated feedback channel estimate, the second echo canceller configured to use the updated feedback channel estimate to remove the feedback transmit signal and the feedback pilot signal from the receive signal, and to thereby generate a second echo cancelled signal indicative of the remote signal; and
   an amplifier to amplify the second echo cancelled signal as the transmit signal, wherein the repeater is configured to add the pilot signal to the transmit signal to be transmitted as the composite transmit signal.

2. The wireless repeater of claim 1, wherein the channel estimation block is configured to generate feedback channel estimates on a substantially continuous basis based on incoming receive signals, the first echo canceller configured to use the updated feedback channel estimate of a previous incoming receive signal as the currently available feedback channel estimate.

3. The wireless repeater of claim 1, wherein the pilot insertion unit is configured to generate the pilot signal so the pilot signal is uncorrelated with the remote signal.

4. The wireless repeater of claim 1, wherein the pilot insertion unit is configured to generate the pilot signal so the pilot signal has a power level that is lower than a power level of the transmit signal.

5. The wireless repeater of claim 4, wherein the pilot insertion unit is configured to generate the pilot signal so the pilot signal has a power level that is at least 20 dB lower than the power level of the transmit signal.

6. The wireless repeater of claim 4, wherein the pilot insertion unit is configured to generate the pilot signal so the pilot signal has a power level that is lower than and a function of a power level of the transmit signal.

7. The wireless repeater of claim 4, wherein the pilot insertion unit is configured to generate the pilot signal so the pilot signal has a power level that is lower than and a function of a power level of the transmit signal and a gain of the repeater.

8. A wireless repeater having a first antenna and a second antenna, the repeater comprising:
   means for generating a pilot signal, the pilot signal being added to a transmit signal for transmission as a composite transmit signal;
   first means for receiving a receive signal and the transmit signal and generating a first echo cancelled signal using a currently available feedback channel estimate, the receive signal being the sum of a remote signal to be amplified, a feedback pilot signal and a feedback transmit signal, the feedback pilot signal and the feedback transmit signal being feedback signals fed back on a feedback channel between the first antenna and the second antenna, the first means using the currently available feedback channel estimate to remove the feedback transmit signal from the receive signal;
   means for receiving the first echo cancelled signal and also receiving the pilot signal as a reference signal, and generating an updated feedback channel estimate based on the first echo cancelled signal and the reference signal;
   second means for receiving the receive signal, the transmit signal and the pilot signal and generating a second echo cancelled signal using the updated feedback channel estimate, the second means using the updated feedback channel estimate to remove the feedback transmit signal and the feedback pilot signal from the receive signal, thereby generating the second echo cancelled signal indicative of the remote signal; and
   means for amplifying the second echo cancelled signal as the transmit signal, the pilot signal being added to the transmit signal to be transmitted as the composite transmit signal.

9. A method for providing echo cancellation in a wireless repeater in a wireless communication system, comprising:
   generating a pilot signal and adding the pilot signal to a transmit signal for transmission as a composite transmit signal;
   receiving a receive signal at a first antenna of the repeater, the receive signal being the sum of a remote signal to be amplified, a feedback pilot signal and a feedback transmit signal, the feedback pilot signal and the feedback transmit signal being feedback signals fed back to the first antenna on a feedback channel between second antenna and the first antenna;
   cancelling the feedback transmit signal from the receive signal using a currently available feedback channel estimate and generating a first echo cancelled signal;
   generating an updated feedback channel estimate using the first echo cancelled signal and the pilot signal as a reference signal;
   cancelling the feedback transmit signal and the feedback pilot signal from the receive signal using the updated feedback channel estimate and generating a second echo cancelled signal;
   amplifying the second echo cancelled signal as the transmit signal; and
   transmitting the transmit signal and the pilot signal on the second antenna as the composite transmit signal.

10. The method of claim 9, wherein generating an updated feedback channel estimate using the first echo cancelled signal and the pilot signal as a reference signal comprises:

generating an updated feedback channel estimate using the first echo cancelled signal and the pilot signal as a reference signal on a substantially continuous basis based on incoming receive signals.

11. The method of claim 10, wherein cancelling the feedback transmit signal from the receive signal using a currently available feedback channel estimate comprises:
cancelling the feedback transmit signal from the receive signal using the updated feedback channel estimate of a previous incoming receive signal as the currently available feedback channel estimate.

12. The method of claim 9, wherein the pilot signal is uncorrelated with the remote signal.

13. The method of claim 9, wherein the pilot signal has a power level that is lower than the power level of the transmit signal.

14. The method of claim 13, wherein the pilot signal has a power level that is at least 20 dB lower than the power level of the transmit signal.

15. The method of claim 13, wherein the pilot signal has a power level that is a lower than and a function of a power level of the transmit signal.

16. The method of claim 13, wherein the pilot signal has a power level that is lower than and a function of a power level of the transmit signal and a gain of the repeater.

17. A wireless repeater having a first antenna and a second antenna, the repeater comprising:
a pilot insertion unit to generate a pilot signal, the pilot signal being added to a transmit signal for transmission as a composite transmit signal;
a first echo canceller to receive a receive signal and the transmit signal and generating a first echo cancelled signal using a currently available feedback channel estimate, the receive signal being the sum of a remote signal to be amplified, a feedback pilot signal and a feedback transmit signal, the feedback pilot signal and the feedback transmit signal being feedback signals fed back on a feedback channel between the first antenna and the second antenna, the first echo canceller using the currently available feedback channel estimate to remove the feedback transmit signal from the receive signal;
a channel estimation block to receive the first echo cancelled signal and also to receive the pilot signal as a reference signal, the channel estimation block configured to generate an updated feedback channel estimate based on the first echo cancelled signal and the reference signal;
a second echo canceller to receive the first echo cancelled signal and the pilot signal and configured to generate a second echo cancelled signal using the updated feedback channel estimate, the second echo canceller configured to use the updated feedback channel estimate to remove the feedback pilot signal from the first echo cancelled signal, thereby generating the second echo cancelled signal indicative of the remote signal; and
an amplifier to amplify the second echo cancelled signal as the transmit signal, the pilot signal being added to the transmit signal to be transmitted as the composite transmit signal.

18. The wireless repeater of claim 17, wherein the channel estimation block is configured to generate feedback channel estimates on a substantially continuous basis based on incoming receive signals, the first echo canceller to use the updated feedback channel estimate of a previous incoming receive signal as the currently available feedback channel estimate.

19. The wireless repeater of claim 17, wherein the pilot insertion unit is configured to generate the pilot signal so the pilot signal is uncorrelated with the remote signal.

20. The wireless repeater of claim 17, wherein the pilot insertion unit is configured to generate the pilot signal so the pilot signal has a power level that is lower than the power level of the transmit signal.

21. The wireless repeater of claim 20, wherein the pilot insertion unit is configured to generate the pilot signal so the pilot signal has a power level that is at least 20 dB lower than the power level of the transmit signal.

22. The wireless repeater of claim 20, wherein the pilot insertion unit is configured to generate the pilot signal so the pilot signal has a power level that is lower than and a function of a power level of the transmit signal.

23. The wireless repeater of claim 20, wherein the pilot insertion unit is configured to generate the pilot signal so the pilot signal has a power level that is lower than and a function of a power level of the transmit signal and a gain of the repeater.

24. A wireless repeater having a first antenna and a second antenna, the repeater comprising:
means for generating a pilot signal, the pilot signal being added to a transmit signal for transmission as a composite transmit signal;
first means for receiving a receive signal and the transmit signal and generating a first echo cancelled signal using a currently available feedback channel estimate, the receive signal being the sum of a remote signal to be amplified, a feedback pilot signal and a feedback transmit signal, the feedback pilot signal and the feedback transmit signal being feedback signals fed back on a feedback channel between the first antenna and the second antenna, the first means using the currently available feedback channel estimate to remove the feedback transmit signal from the receive signal;
means for receiving the first echo cancelled signal and also receiving the pilot signal as a reference signal, and generating an updated feedback channel estimate based on the first echo cancelled signal and the reference signal;
second means for receiving the first echo cancelled signal and the pilot signal and generating a second echo cancelled signal using the updated feedback channel estimate, the second means using the updated feedback channel estimate to remove the feedback pilot signal from the first echo cancelled signal, thereby generating the second echo cancelled signal indicative of the remote signal; and
means for amplifying the second echo cancelled signal as the transmit signal, the pilot signal being added to the transmit signal to be transmitted as the composite transmit signal.

25. A method for providing echo cancellation in a wireless repeater in a wireless communication system, comprising:
generating a pilot signal and adding the pilot signal to a transmit signal for transmission on a first antenna as a composite transmit signal;
receiving a receive signal at a second antenna of the repeater, the receive signal being the sum of a remote signal to be amplified, a feedback pilot signal and a feedback transmit signal, the feedback pilot signal and the feedback transmit signal being feedback signals fed back to the receiving antenna on a feedback channel between the first antenna and the second antenna;
cancelling the feedback transmit signal from the receive signal using a currently available feedback channel estimate and generating a first echo cancelled signal;

generating an updated feedback channel estimate using the first echo cancelled signal and the pilot signal as a reference signal;

cancelling the feedback pilot signal from the first echo cancelled signal using the updated feedback channel estimate and generating a second echo cancelled signal;

amplifying the second echo cancelled signal as the transmit signal; and transmitting the transmit signal and the pilot signal on the first antenna as the composite transmit signal.

26. The method of claim 25, wherein generating an updated feedback channel estimate using the first echo cancelled signal and the pilot signal as a reference signal comprises:

generating an updated feedback channel estimate using the first echo cancelled signal and the pilot signal as a reference signal on a substantially continuous basis based on incoming receive signals.

27. The method of claim 26, wherein cancelling the feedback transmit signal from the receive signal using a currently available feedback channel estimate comprises:

cancelling the feedback transmit signal from the receive signal using the updated feedback channel estimate of a previous incoming receive signal as the currently available feedback channel estimate.

28. The method of claim 25, wherein the pilot signal is uncorrelated with the remote signal.

29. The method of claim 25, wherein the pilot signal has a power level that is lower than the power level of the transmit signal.

30. The method of claim 29, wherein the pilot signal has a power level that is at least 20 dB lower than the power level of the transmit signal.

31. The method of claim 29, wherein the pilot signal has a power level that is a lower than and a function of a power level of the transmit signal.

32. The method of claim 29, wherein the pilot signal has a power level that is lower than and a function of a power level of the transmit signal and a gain of the repeater.

* * * * *